US009365953B2

(12) United States Patent
Tam et al.

(10) Patent No.: US 9,365,953 B2
(45) Date of Patent: *Jun. 14, 2016

(54) ULTRA-HIGH STRENGTH UHMWPE FIBERS AND PRODUCTS

(75) Inventors: Thomas Y. Tam, Chesterfield, VA (US); John A. Young, Midlothian, VA (US); Norman Aminuddin, Waynesboro, VA (US); John E. Hermes, Colonial Heights, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1288 days.

This patent is subject to a terminal disclaimer.

(21) Appl. No.: 13/173,919

(22) Filed: Jun. 30, 2011

(65) Prior Publication Data

US 2011/0269359 A1   Nov. 3, 2011

Related U.S. Application Data

(63) Continuation-in-part of application No. 12/771,914, filed on Apr. 30, 2010, now Pat. No. 8,747,715, which is a continuation-in-part of application No. 12/589,285, filed on Oct. 21, 2009, now Pat. No. 7,736,561, which is a continuation of application No. 11/811,570, filed on Jun. 8, 2007, now Pat. No. 7,638,191.

(51) Int. Cl.
  *B29C 47/78*  (2006.01)
  *D01F 6/04*  (2006.01)
  *B29C 47/00*  (2006.01)
  *D04H 3/007*  (2012.01)
  *D04H 3/115*  (2012.01)
  *B29C 47/36*  (2006.01)
  *B29C 47/40*  (2006.01)
  *B29K 23/00*  (2006.01)

(52) U.S. Cl.
  CPC .............. *D01F 6/04* (2013.01); *B29C 47/0014* (2013.01); *B29C 47/0057* (2013.01); *B29C 47/364* (2013.01); *D04H 3/007* (2013.01); *D04H 3/115* (2013.01); *B29C 47/40* (2013.01); *B29K 2023/0683* (2013.01); *B32B 2250/40* (2013.01); *B32B 2250/42* (2013.01); *B32B 2260/023* (2013.01); *B32B 2260/046* (2013.01); *B32B 2260/048* (2013.01); *B32B 2262/0253* (2013.01); *B32B 2307/54* (2013.01); *B32B 2571/02* (2013.01); *Y10T 428/2913* (2015.01); *Y10T 428/2933* (2015.01); *Y10T 442/30* (2015.04); *Y10T 442/60* (2015.04)

(58) Field of Classification Search
  CPC .............. D01F 6/04; D01F 6/30; D04H 3/007; D04H 3/115; D04H 13/00; B29C 47/48; B29C 47/0057; B29C 2262/0253; B29C 2250/42; B29C 260/048; B29C 2260/023; B29C 2307/54; B29C 2250/40; B32B 2571/02; D03D 15/00; D02G 3/00
  USPC ........ 264/164, 176.1, 204, 205, 209.5, 210.5, 264/210.7, 210.8, 211.12, 234, 288.4, 264/290.5; 425/66, 72.2, 377, 378.1, 378.2, 425/382.2, 464; 428/292.1, 357, 364, 365, 428/902; 442/172, 173, 286, 394
  See application file for complete search history.

(56) References Cited

U.S. PATENT DOCUMENTS

| | | |
|---|---|---|
| 4,344,908 A | 8/1982 | Smith et al. |
| 4,413,110 A | 11/1983 | Kavesh et al. |
| 4,430,383 A | 2/1984 | Smith et al. |
| 4,551,296 A | 11/1985 | Kavesh et al. |
| 4,655,769 A | 4/1987 | Zachariades |
| 4,663,101 A | 5/1987 | Kavesh et al. |
| 4,870,136 A | 9/1989 | Yagi et al. |
| 4,894,281 A | 1/1990 | Yagi et al. |
| 5,032,338 A | 7/1991 | Weedon et al. |
| 5,037,928 A | 8/1991 | Li et al. |
| 5,068,073 A | 11/1991 | Pennings et al. |
| 5,160,472 A | 11/1992 | Zachariades |
| 5,200,129 A | 4/1993 | Kobayashi et al. |
| 5,342,567 A | 8/1994 | Chen et al. |
| 5,702,657 A | 12/1997 | Yoshida et al. |

(Continued)

FOREIGN PATENT DOCUMENTS

| | | |
|---|---|---|
| EP | 0212133 | 3/1987 |
| EP | 2 080 824 A1 | 7/2009 |
| JP | 6-1174416 A | 10/1990 |
| JP | 6-166028 A | 6/1994 |
| JP | 2001-207339 A | 8/2001 |
| JP | 2001-207340 A | 8/2001 |
| JP | 2009-500091 | 1/2009 |
| WO | 90/11060 A1 | 10/1990 |
| WO | 9700766 | 1/1997 |
| WO | 2005/066401 A1 | 7/2005 |

(Continued)

OTHER PUBLICATIONS

Penning, J.P. et al. "Influence of chemical crosslinking on the creep behavior of ultra-high molecular weight polyethylene fibers,"Colloid and Polymer Science, Jun. 1994, vol. 272, No. 6, p. 664-676.

(Continued)

*Primary Examiner* — Arti Singh-Pandey
(74) *Attorney, Agent, or Firm* — Roberts & Roberts, LLP; Richard S. Roberts, Jr.

(57) ABSTRACT

Multi-filament ultra high molecular weight polyethylene fibers can be produced according to processes that result in improved properties. The ultra high molecular weight polyethylene can have an intrinsic viscosity in decalin at 135° C. of at least about 30 dl/g, and can be processed under optimal conditions to achieve a gel spun fiber having a tenacity of greater than about 45 g/denier (40.5 g/dtex).

20 Claims, 3 Drawing Sheets

(56) References Cited

U.S. PATENT DOCUMENTS

| | | | |
|---|---|---|---|
| 5,741,451 A | 4/1998 | Dunbar et al. | |
| 5,859,232 A | 1/1999 | Ravikumar | |
| 6,287,689 B1 | 9/2001 | Elliott et al. | |
| 6,433,120 B1 | 8/2002 | Rastogi et al. | |
| 6,448,359 B1 | 9/2002 | Kavesh | |
| 6,770,365 B2 | 8/2004 | Yoshimura et al. | |
| 6,969,553 B1 | 11/2005 | Tam et al. | |
| 7,081,298 B2 | 7/2006 | Nakanishi | |
| 7,370,395 B2 | 5/2008 | Tam | |
| 7,638,191 B2* | 12/2009 | Tam | D01D 5/06 428/364 |
| 7,736,561 B2* | 6/2010 | Tam | D01D 5/06 264/178 F |
| 7,846,363 B2 | 12/2010 | Tam et al. | |
| 8,747,715 B2* | 6/2014 | Tam | D01D 5/12 264/205 |
| 2005/0093200 A1 | 5/2005 | Tam et al. | |
| 2007/0231572 A1 | 10/2007 | Tam et al. | |
| 2008/0251212 A1 | 10/2008 | Harding et al. | |
| 2008/0305331 A1 | 12/2008 | Tam et al. | |
| 2008/0318016 A1 | 12/2008 | Weedon et al. | |
| 2009/0048628 A1 | 2/2009 | Marissen | |
| 2010/0286728 A1 | 11/2010 | Simmelink et al. | |
| 2011/0268967 A1 | 11/2011 | Tam et al. | |

FOREIGN PATENT DOCUMENTS

| | | |
|---|---|---|
| WO | 2005066400 | 7/2005 |
| WO | WO 2005-066401 | 7/2005 |
| WO | 2008024732 | 2/2008 |
| WO | 2008154304 | 12/2008 |
| WO | WO 2009-043597 | 4/2009 |
| WO | 2009077168 | 6/2009 |
| WO | 2009124762 | 10/2009 |
| WO | 2009/153314 A1 | 12/2009 |
| WO | 2011137045 | 11/2011 |

OTHER PUBLICATIONS

Maghsoud, Z. et al., "Gel spinning characteristics of ultra-high molecular weight polyethylene and study on fibre structure before drawing," Iranian Polymer Journal (English Edition), Jun. 2007, vol. 16, No. 6, p. 363-373.

Yao, W-H. et al., "A study on preparation and mechanical properties of UHMWPE/nylon composite covered yarn," Proceedings of SPIE—The International Society for Optical Engineering, 2nd International Conference on Smart Materials and Nanotechnology in Engineering Language, 2009, vol. 7493, p. 74932A-1-74932A-8.

Sakai, Y. et al., "Mechanical properties of biaxially drawn films of ultra-high molecular weight polyethylene dried gels," Polymer, 1993, vol. 34, No. 2, p. 318-322.

Smook, J. et al., "Preparation of ultra-high strength polyethylene fibres by gel-spinning/hot-drawing at high spinning rates," Polymer Bulletin, Jan. 1983, vol. 9, p. 75-80.

Wood-Adams, Paula et al., "Thermorheological Behavior of Polyethylene: Effects of Microstructure and Long Chain Branching," Macromolecules 2001, 34, pp. 6281-6290.

Yan, D., et al., "Effect of long chain branching on rheological properties of metallocene polyethylene," Polymer Bulletin, 1999, vol. 40, pp. 1737-1744.

Wood-Adams, Paula et al., "Effect of Molecular Structure on the Linear Viscoelastic Behavior of Polyethylene," Macromolecules 2000, vol. 33, pp. 7489-7499.

Chow, A., et al., "Entanglements in Polymer Solutions under Elongational Flow: A Combined Study of Chain Stretching Flow Velocimetry, and Elongational Viscosity," Macromolecules 1988, vol. 21, pp. 250-256.

Smith, Paul et al., "Tensile Strength of Highly Oriented Polyethylene. II. Effect of Molecular Weight Distribution," Journal of Polymer Science: Polymer Physics Edition, vol. 20, pp. 2229-2241 (1982).

Hoogsteen, W. et al., "Gel-spun polyethylene fibres," Journal of Materials Science vol. 23, (1988) pp. 3467-3474.

Pennings, Albert J. et al., "Mechanical properties of ultra-high molecular weight polyethylene fibres in relation to structural changes and chain scissioning upon spinning and hot-drawing," Journal of Materials Science vol. 19 (1984) pp. 3443-3450.

Kalb, B. et al., "Maximum strength and drawing mechanism of hot drawn high molecular weight polyethylene," Journal of Materials Science, vol. 15 (1980) pp. 2584-2590.

Osamu Ishizuka et al., "Elongational viscosity in the isothermal melt spinning of polypropylene," Polymer Jun. 1980, vol. 21, pp. 691-698.

James L. White et al., "Elongational Flow and Melt-Spinning Instability of Concentrated Suspensions of Small Particles in Polymer Melts, "Journal of Applied Polymer Science, 1981, vol. 26, pp. 579-589.

Gwo-Geng Lin et al., "Measurement of Elongation Viscosity for Polymer Melts by Fiber Spinning," Advances in Polymer Technology, Fall 1997, vol. 16, No. 3, pp. 199-207.

A. Makaradi et al., "Effect of Non-Isothermal Oriented Crystallization on the Velocity and Elongational Viscosity Profiles During the Melt Spinning of High Density Polyethylene Fibers," Polymer Engineering and Science Jul. 2001, vol. 41, No. 7, pp. 1107-1114.

F.N. Cogswell, Trans. Soc. Rheology, 16(3), 303-403 (1972).

International Search Report for International Application No. PCT/US2011/033714 (Jan. 29, 2013).

Notice of Allowance for U.S. Appl. No. 12/771,914.

International Search Report for International Application No. PCT/US2011/033714.

Supplementary European Search Report for European Patent Application No. EP12804252.

* cited by examiner ment yarns formed from polyethylene solutions via extrusion through a multi-orifice spinneret into a cross-flow gas stream to form a fluid product. The fluid product is gelled, stretched and formed into a xerogel. The xerogel is then subjected to a dual stage stretch to form the desired multifilament yarns. U.S. Pat. No. 7,078,099 describes drawn, gel-spun multifilament polyethylene yarns having increased perfection of molecular structure. The yarns are produced by an improved gel spinning process and are drawn under specialized conditions to achieve multifilament yarns having a high degree of molecular and crystalline order. U.S. Pat. No. 7,344,668 describes a process for drawing essentially diluent-free gel-spun polyethylene multifilament yarns in a forced convection air oven and the drawn yarns produced thereby. The process conditions of draw ratio, stretch rate, residence time, oven length and feed speed are selected in specific relation to one another so as to achieve enhanced efficiency and productivity.

However, with the constantly broadening scope of ballistic threats, and the rapid expansion of people that feel a need to protect themselves from such threats, there is an ongoing need in the art to reduce the weight of ballistic resistant materials without reducing the effectiveness of the materials in defending against ballistic threats. The invention provides a solution to this need in the art, providing an improved process for producing gel spun fibers and yarns made from ultra high molecular weight polyethylene, and providing fabrics, fibrous composites and articles formed from said fibers and yarns. The process of the invention achieves the formation of fibers and yarns having a tenacity of at least about 45 g/denier (40.5 g/dtex), from which composites having improved ballistic performance may be fabricated.

ULTRA-HIGH STRENGTH UHMWPE FIBERS AND PRODUCTS

CROSS-REFERENCE TO RELATED APPLICATION

This application is a Continuation-in-Part of application Ser. No. 12/771,914, filed Apr. 30, 2010, now U.S. Pat. No. 8,747,715 issued Jun. 10, 2014, the entire disclosure of which is incorporated by reference herein, which is a continuation-in-part of U.S. patent application Ser. No. 12/589,285 filed on Oct. 21,2009, now U.S. Pat. No. 7,736,561 issued on Jun. 15,2010, which is a continuation of U.S. patent application Ser. No. 11/811,570 filed on Jun. 8,2007, now U.S. Pat. No. 7,638,191 issued on Dec. 29,2009.

FIELD OF THE INVENTION

The present technology relates to ultra-high molecular weight polyethylene filaments and yarns formed from such filaments, as well as to processes for the preparation of UHMWPE filaments.

DESCRIPTION OF RELATED ART

Many different techniques are known for the fabrication of high tenacity filaments and fibers, including high molecular weight polyethylene fibers and filaments. High tenacity polyethylene fibers may be made by spinning a solution containing ultra-high molecular weight polyethylene swelled with a suitable solvent into solution filaments of ultrahigh molecular weight polyethylene, followed by cooling the solution filaments to a gel state to form gel filaments, then removing the spinning solvent to form solvent-free filaments. One or more of the solution filaments, the gel filaments and the solvent-free filaments are stretched or drawn to a highly oriented state in one or more stages. In general, such filaments are known as "gel-spun" polyethylene filaments. The gel spinning process is desirable because it discourages the formation of folded chain molecular structures and favors formation of extended chain structures that more efficiently transmit tensile loads. Gel-spun filaments also tend to have melting points higher than the melting point of the polymer from which they were formed. For example, high molecular weight polyethylene having a molecular weight of about 150,000 to about two million generally have melting points in the bulk polymer of 138° C. Highly oriented polyethylene filaments made of these materials have melting points of from about 7° C. to about 13° C. higher. This slight increase in melting point reflects the crystalline perfection and higher crystalline orientation of the filaments as compared to the bulk polymer.

Various methods for forming gel-spun polyethylene filaments have been described, for example, in U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,746,975; 6,969,553; 7,078,099 and 7,344,668, all of which are incorporated herein by reference to the extent compatible herewith. For example, U.S. Pat. Nos. 4,413,110, 4,663,101 and 5,736,244 describe the formation polyethylene gel precursors and the stretching of low porosity xerogels obtained therefrom to form high tenacity, high modulus fibers. U.S. Pat. Nos. 5,578,374 and 5,741,451 describe post-stretching a polyethylene fiber which has already been oriented by drawing at a particular temperature and draw rate. U.S. Pat. No. 6,746,975 describes high tenacity, high modulus multifila-

SUMMARY OF THE INVENTION

A fiber comprising ultra high molecular weight polyethylene (UHMWPE) having a tenacity of at least about 45 g/denier (40.5 g/dtex) and a tensile modulus of at least about 1400 g/denier, said fiber being produced by a process comprising the steps of:

a) feeding a slurry that comprises an UHMWPE polymer and a spinning solvent to an extruder to produce a liquid mixture, the UHMWPE polymer having an intrinsic viscosity in decalin at 135° C. of at least about 30 dl/g; or feeding the UHMWPE polymer and spinning solvent into an extruder and forming both a slurry and a liquid mixture inside the extruder;

b) passing the liquid mixture through a heated vessel to form a homogeneous solution comprising the UHMWPE polymer and the spinning solvent;

c) providing the solution from the heated vessel to a spinneret to form a solution fiber;

d) drawing the solution fiber that issues from the spinneret at a draw ratio of from about 1.1:1 to about 30:1 to form a drawn solution fiber;

e) cooling the drawn solution fiber to a temperature below the gel point of the UHMWPE polymer to form a gel fiber;

f) drawing the gel fiber in one or more stages at a first draw ratio DR1 of from about 1.1:1 to about 30:1;

g) drawing the gel fiber at a second draw ratio DR2;

h) removing spinning solvent from the gel fiber in a solvent removal device to form a dry fiber;

i) drawing the dry fiber at a third draw ratio DR3 in at least one stage to form a partially oriented fiber;

j) transferring the partially oriented fiber to a post drawing operation; and k) drawing the partially oriented fiber at a post drawing temperature in the post drawing operation to a fourth draw ratio DR4 of from about 1.8:1 to about 15:1 to form a highly oriented fiber product having a tenacity of at least about 45 g/denier (40.5 g/dtex).

Also provided are fiber layers, fabrics, fibrous composites and articles comprising fibers produced according to said process and having a tenacity of at least about 45 g/denier.

DETAILED DESCRIPTION OF THE INVENTION

Filaments, fibers and yarns made by gel spinning polymers such as ultra high molecular weight polyolefins (UHMWPO), and in particular ultra-high molecular weight polyethylene, can be utilized in a wide variety of applications, such as ballistic articles such as body armor, helmets, breast plates, helicopter seats, spall shields, and composite materials utilized in applications including sports equipment such as kayaks, canoes, bicycles and boats, as well as in fishing line, sails, ropes, sutures and fabrics.

Conventional gel spinning processes involve forming of a solution of polymer, such as UHMWPE, and a spinning solvent, passing the solution through a spinneret To form a solution yarn including a plurality of solution filaments, also referred to as being fibers, cooling the solution yarn to form a gel yarn, removing the spinning solvent to form an essentially dry yarn, and stretching at least one of the solution yarn, the gel yarn and the dry yarn. As used herein, a "filament" or "fiber" is an elongate body the length dimension of which is much greater than the transverse dimensions of width and thickness. The fibers of the invention may be of irregular or regular multi-lobal cross-section having one or more regular or irregular lobes projecting from the linear or longitudinal axis of the fibers. The cross-sections of fibers for use in this invention may vary widely, and they may be circular, flat or oblong in cross-section.

Thus the term "fiber" as used herein includes filaments, ribbons, strips and the like having regular or irregular cross-section, but it is preferred that the fibers have a substantially circular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. The definition of multifilament fibers herein also encompasses pseudo-monofilament fibers, which is a term of art describing multifilament fibers that are at least partially fused together and look like monofilament fibers. Multifilament fibers of the invention preferably include from 2 to about 500 filaments, more preferably from 2 to 250 filaments, more preferably from 2 to 100 filaments, more preferably from 2 to 20 filaments, more preferably from 2 to 10 filaments and most preferably from 2 to 5 filaments. As used herein, "yarn" is a continuous strand formed from, or made up of, a plurality of fibers or filaments.

Figure 1:
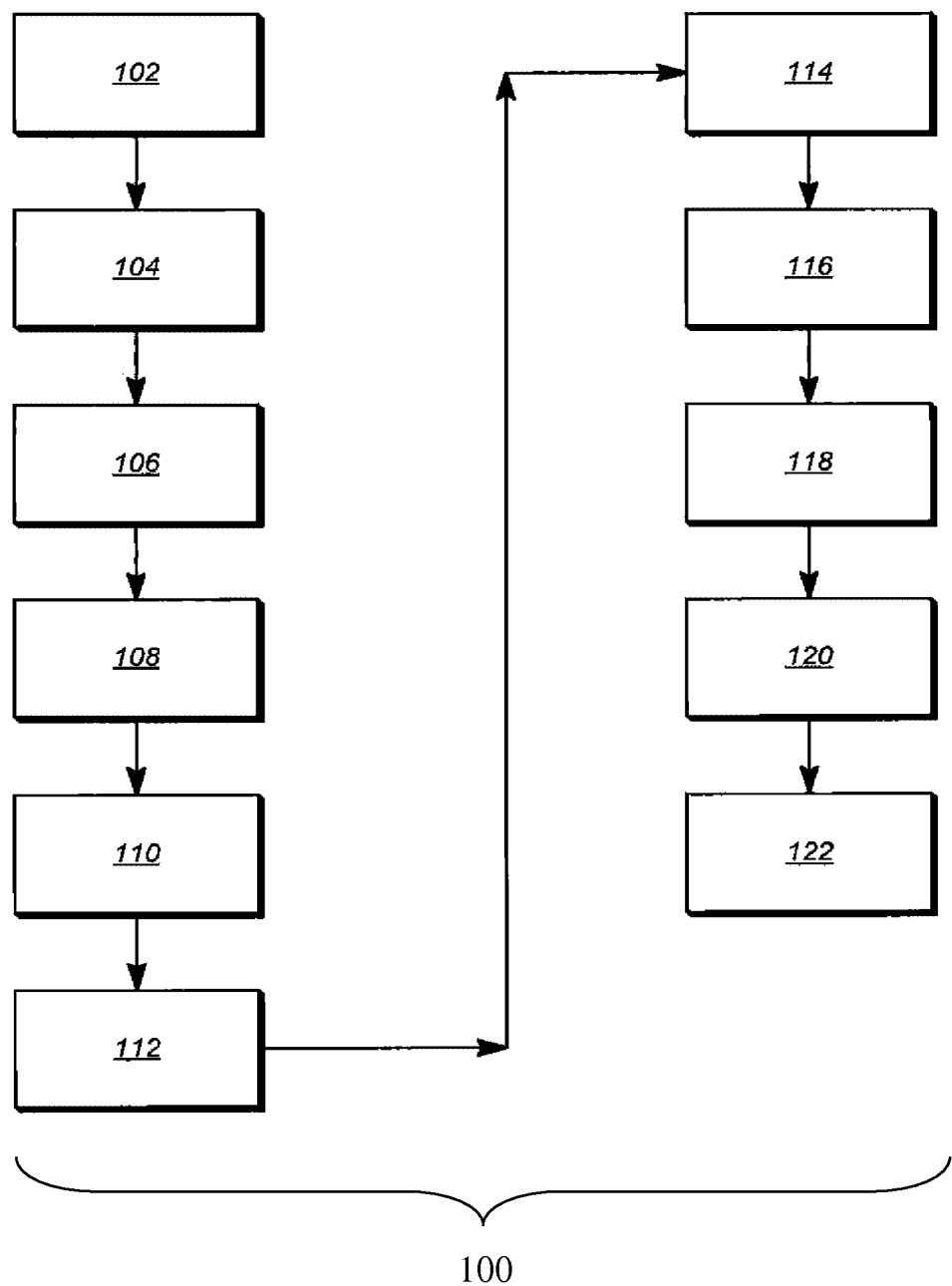
FIG. 1 illustrates a process flow diagram for producing UHMWPE gel spun filaments and yarns.

FIG. 1 provides a flow chart for one example of a gel spinning process 100 for producing UHMWPE gel spun filaments and fibers/yarns from solutions comprising UHMWPE and a spinning solvent. The solution can include UHMWPE in an amount of from about 1% by weight to about 50% by weight of the solution, preferably from about 2% by weight to about 30% by weight of the solution, and more preferably from about 5% by weight to about 20% by weight of the solution, or from about 6% by weight to about 10% by weight of the solution. The step of forming the solution can include forming a slurry that includes the UHMWPE and the spinning solvent. The components of the slurry can be provided in any suitable manner. For example, the slurry can be formed by combining the UHMWPE and the spinning solvent, and then providing the combined UHMWPE and spinning solvent to an extruder 102. Alternatively, the slurry can be formed by combining the UHMWPE and the spinning solvent within the extruder 102. The slurry can be formed at a temperature that is below the temperature at which the UHMWPE will melt, and is thus also below the temperature at which the UHMWPE will dissolve in the spinning solvent. For example, the slurry can be formed at room temperature, or can be heated to a temperature of up to about 110° C. The slurry preferably comprises a weight ratio of the UHMWPE polymer to the spinning solvent of from about 5:95 to about 95:5. More preferably, the slurry comprises a weight ratio of the UHMWPE polymer to the spinning solvent of from about 6:94 to about 50:50, and even more preferably from about 8:92 to about 30:70.

The UHMWPE that is selected for use in the gel spinning process preferably has one or more preferred properties. For example, the UHMWPE polymer preferably has an intrinsic viscosity in decalin at 135° C. of at least about 30 dl/g, or greater than about 30 dl/g, including being from about 30 dl/g to about 100 dl/g, or greater than about 100 dl/g. In some examples, the UHMWPE can have an intrinsic viscosity in decalin at 135° C. of about 30 dl/g, about 35 dl/g, about 40 dl/g, about 45 dl/g, about 50 dl/g, about 55 dl/g, about 60 dl/g, about 65 dl/g, about 80 dl/g, about 85 dl/g, about 90 dl/g, about 95 dl/g, or about 100 dl/g.

As another example, in a solution comprising UHMWPE with a mineral oil Spinning solvent, a 10 wt. % solution of the UHMWPE in mineral oil at 250° C., i.e. a solution comprising 10 parts by weight of UHMWPE per 100 parts by weight of the total solution, can have a desired Cogswell extensional viscosity ($\lambda$) in Pascal-seconds (Pa-s) and a desired shear viscosity.

For purposes of the invention, the Cogswell extensional viscosity can be defined as the value at an extensional rate of 1 sec$^{-1}$. In a first method of selecting an UHMWPE having a desired Cogswell extensional viscosity ($\lambda$) in Pascal-seconds (Pa-s) and a desired shear viscosity, the 10 wt. % solution of the UHMWPE in mineral oil at 250° C. can have a Cogswell extensional viscosity in accordance with the following formula:

$$\lambda \geq 5{,}917(IV)^{0.8}$$

In one such example, a 10 wt. % solution of the UHMWPE in mineral oil at a temperature of 250° C. can have a Cogswell extensional viscosity at least 65,000 Pa-s. In another example, a 10 wt. % solution of the UHMWPE in mineral oil at a temperature of 250° C. can have a Cogswell extensional viscosity ($\lambda$) in Pascal-seconds (Pa-s) in accordance with the following formula:

$$\lambda \geq 7{,}282(IV)^{0.8}$$

In yet another example, a 10 wt. % solution of the UHMWPE in mineral oil at a temperature of 250° C. can have a Cogswell extensional viscosity ($\lambda$) in Pascal-seconds (Pa-s) in accordance with the following formula:

$$\lambda \geq 10{,}924(IV)^{0.8}$$

In some examples, the 10 wt. % solution of the UHMWPE in mineral oil at 250° C. has a Cogswell extensional viscosity that is both greater than or equal to $5,917(IV)^{0.8}$, greater than or equal to $7,282(IV)^{0.8}$, or greater than or equal to $10,924$ $(IV)^{0.8}$, and is also at least five times greater than the shear viscosity of the solution.

In a second method of selecting an UHMWPE having a desired Cogswell extensional viscosity ($\lambda$) in Pascal-seconds (Pa-s) and a desired shear viscosity, the 10 wt. % solution of the UHMWPE in mineral oil at 250° C. can have a Cogswell extensional viscosity that is at least eight times the shear viscosity of the solution. In other words, the Cogswell extensional viscosity of the solution can be greater than or equal to eight times the shear viscosity of the solution, regardless of whether the Cogswell extensional viscosity is greater than or equal to $5,917(IV)^{0.8}$. In one example, a 10 wt. % solution of the UHMWPE in mineral oil at 250° C. has a Cogswell extensional viscosity and a shear viscosity such that the Cogswell extensional viscosity of the solution is at least eleven times the shear viscosity of the solution. In such examples, the Cogswell extensional viscosity can also be greater than or equal to $5,917(IV)^{0.8}$, greater than or equal to $7,282(IV)^{0.8}$, or greater than or equal to $10,924 (IV)^{0.8}$.

In conducting the gel spinning processes described herein, the shear viscosity and the Cogswell extensional viscosity ($\lambda$) can be measured in accordance with the exemplary procedures described below.

A solution of UHMWPE was prepared at a concentration of 10 wt. % in HYDROBRITE® 550 PO white mineral oil, commercially available from Sonneborn, LLC of Mahwah, N.J. The white mineral oil had a density of from about 0.860 g/cm³ to about 0.880 g/cm³ as measured according to ASTM D4052 at a temperature of 25° C., and a kinematic viscosity of from about 100 cSt to about 125 cSt as measured according to ASTM D445 at a temperature of 40° C. The white mineral oil also consisted of from about 67.5% paraffinic carbon to about 72.0% paraffinic carbon, and from about 28.0% to about 32.5% napthenic carbon as calculated according to ASTM D3238. The white mineral oil had a 2.5% distillation temperature of about 298° C. at 10 mm Hg as measured according to ASTM D1160, and also had an average molecular weight of about 541 as measured according to ASTM D2502.

The solution was formed at an elevated temperature in a twin screw extruder, although other conventional devices, including but not limited to a Banbury Mixer, would also be suitable. The solution was cooled to a gel state, thereby forming a polymer gel, and the gel was charged to the identical twin barrels of a Dual Barrel Capillary Rheometer (Dual Barrel LCR 7002 Rheometer, commercially available from Dynisco Instruments of Franklin, Mass.). Pistons were placed in the twin barrels of the rheometer. The barrels of the rheometer were maintained at a temperature of 250° C., and the polymer gel was converted back into a solution and was equilibrated at that temperature. The pistons were driven into the barrels of the rheometer simultaneously by a common mechanism. The polymer solution was then extruded through a capillary die at the exit of each barrel. The dies each had a capillary diameter (D) of 1 mm One die had a capillary length (L1) of 30 mm; the other had a capillary length (L2) of 1 mm Pressure transducers mounted above the dies measured the pressure (P1, P2) that developed in each barrel.

The test proceeded by actuating the motion of the pistons at a series of speed steps increasing in ratios of about 1.2:1. The piston speeds and barrel pressures that developed were recorded. The rheometer automatically stepped to the next speed level when a steady state was achieved. The pressure and speed data were automatically transferred to a spreadsheet program provided with the LCR 7002 Dual Barrel Capillary Rheometer that performed the necessary calculations.

The discharge rate (Q, cm³/sec) of the UHMWPE solution was calculated from the piston diameter and the piston speed.

The apparent shear stress at the wall of a capillary ($\tau_{a,i}$) can be calculated from the relationship:

$$\tau_{a,i} = \frac{DP_i}{4L_i} \qquad \text{Equation 1}$$

where i is 1, 2 corresponding to barrel 1 or barrel 2.

The apparent shear rate at the capillary wall can be calculated as:

$$\dot{\gamma}_{a,i} = \frac{32Q}{\pi D^3} \qquad \text{Equation 2}$$

The apparent shear viscosity can be defined as:

$$\eta_{a,i} = \frac{\tau_{a,i}}{\dot{\gamma}_{a,i}} \qquad \text{Equation 3}$$

A correction, known as the Rabinowitsch correction, can be applied to the shear rate to correct for the non-Newtonian character of the polymer solution. The true shear rate at the wall of the capillary can be calculated as:

$$\dot{\gamma}_i = \left[\frac{3n*+1}{4n*}\right]\dot{\gamma}_{a,i} \qquad \text{Equation 4}$$

where n* is the slope of a plot of log $\tau_{a,i}$ versus log $\dot{\gamma}_{a,i}$.

A correction, known as the Bagely correction can be applied to the shear stress to account for the energy lost in funneling the polymer solution from the barrel into the die. This extra energy loss can appear as an increase in the effective length of the die. The true shear stress is given by:

$$\tau_i = \frac{D}{4L}(P_i - P_0) \qquad \text{Equation 5}$$

$P_0$ can be obtained from a linear regression of $P_1$ and $P_2$ versus $L_1$ and $L_2$. $P_0$ is the intercept at L=0.

The true shear viscosity can be obtained as a function of shear rate as follows:

$$\eta_i = \frac{\tau_i}{\dot{\gamma}_i} \qquad \text{Equation 6}$$

The shear viscosity can be defined as the value at a shear rate of 1 sec$^{-1}$.

As the polymer solution flows from the barrels of the rheometer into a die, the stream lines converge. Such a flow field can be interpreted as an extensional deformation superposed onto a simple shear flow. Cogswell showed how these components can be treated separately as a way of measuring extensional rheology (see F. N. Cogswell, *Trans. Soc. Rheology*, 16(3), 383-403 (1972)).

The extensional stress $\sigma_e$ and the extensional strain E can be given by Equations 7 and 8, respectively, as follows:

$$\sigma_e = 3/8(n+1)P_0 \qquad \text{Equation 7}$$

$$\varepsilon_i = \frac{4\eta_i \dot{\gamma}_i^2}{3(n+1)P_0)} \qquad \text{Equation 8}$$

The Cogswell extensional viscosity ($\lambda$) can then be calculated as follows:

$$\lambda_i = \frac{9(n+1)^2}{32\eta_i}\left(\frac{P_0}{\dot{\gamma}_i}\right)^2 \qquad \text{Equation 9}$$

where n in Equations 7-9 is the slope of a plot of log $\sigma_e$ versus log $\epsilon_i$.

With respect to the molecular structure of the UHMWPE selected for use in the gel spinning processes disclosed herein, it is preferred that the UHMWPE have fewer than 10 short side branches per 1,000 carbon atoms, the short side branches comprising from 1 to 4 carbon atoms. For example, the UHMWPE can have fewer than 5 short side branches per 1,000 carbon atoms, fewer than 2 short side branches per 1,000 carbon atoms, fewer than 1 short side branch per 1,000 carbon atoms, or fewer than 0.5 short side branches per 1000 carbon atoms. Side groups may include but are not limited to $C_1$-$C_{10}$ alkyl groups, vinyl terminated alkyl groups, norbornene, halogen atoms, carbonyl, hydroxyl, epoxide and carboxyl. The UHMWPE polymer can also contain small amounts, generally less than about 5 wt. %, preferably less than about 3 wt. %, and more preferably less than about 2 wt. %, of additives such as anti-oxidants, thermal stabilizers, colorants, flow promoters, solvents, and other additives. In examples where the UHMWPE polymer contains at least one anti-oxidant, the anti-oxidant can be selected from the group consisting of hindered phenols, aromatic phosphites, amines and mixtures thereof. Preferably, the anti-oxidant can be selected from the group consisting of (2,6-di-tert-butyl-4-methyl-phenol, tetrakis[methylene(3,5-di-tert-butylhydroxyhydrocinnamate)]methane, tris(2,4-di-tert-butylphenyl)phosphite, octadecyl 3,5-di-tert-butyl-4-hyroxyhydrocinnamate, 1,3,5-tris(3,5-di-tert-butyl-4-hydroxybenzyl)-1,3,5-triazine-2,4,6 (1H,3H,5H)-trione, 2,5, 7,8 tetramethyl-2(4',8',12'-trimethyltridecyl)chroman-6-ol and mixtures thereof. In one example, the anti-oxidant can be 2,5,7,8tetramethyl-2(4',8',12'-trimethyltridecyl)chroman-6-ol, commonly known as Vitamin E or $\alpha$-tocopherol.

The UHMWPE polymer is preferably provided in particulate form prior to combination with the spinning solvent. As has been discussed in U.S. Pat. No. 5,032,338, the disclosure of which is incorporated herein by reference, the particle size and particle size distribution of the particulate UHMWPE polymer can affect the extent to which the UHMWPE polymer dissolves in the spinning solvent during formation of the solution that is to be gel spun. As discussed further below, it is desirable that the UHMWPE polymer be completely dissolved in the solution. Accordingly, in one preferred example, the UHMWPE has an average particle size of from about 100 microns ($\mu$m) to about 200 $\mu$m. In such an example, it is preferred that up to about, or at least about 90% of the UHMWPE particles have a particle size that is within 40 $\mu$m of the average UHMWPE particle size. In other words, up to about, or at least about 90% of the UHMWPE particles have a particle size that is equal to the average particle size plus or minus 40 $\mu$m. In another example, about 75% by weight to about 100% by weight of the UHMWPE particles utilized can have a particle size of from about 100 $\mu$m to about 400 $\mu$m, and preferably about 85% by weight to about 100% by weight of the UHMWPE particles have a particle size of from about 120 $\mu$m to 350 $\mu$m. Additionally, the particle size can be distributed in a substantially Gaussian curve of particle sizes centered at about 125 to 200 $\mu$m. It is also preferred that about 75% by weight to about 100% by weight of the UHMWPE particles utilized have a weight average molecular weight of from about 300,000 to about 7,000,000, more preferably from about 700,000 to about 5,000,000. It is also preferred that at least about 40% of the particles be retained on a No. 80 mesh screen.

The spinning solvent can be any suitable spinning solvent, including, but not limited to, a hydrocarbon that has a boiling point over 100° C. at atmospheric pressure. The spinning solvent can be selected from the group consisting of hydrocarbons such as aliphatics, cyclo-aliphatics, and aromatics; and halogenated hydrocarbons such as dichlorobenzene; and mixtures thereof. In some examples, the spinning solvent can have a boiling point of at least about 180° C. at atmospheric pressure. In such examples, the spinning solvent can be selected from the group consisting of halogenated hydrocarbons, mineral oil, decalin, tetralin, naphthalene, xylene, toluene, dodecane, undecane, decane, nonane, octene, cis-decahydronaphthalene, trans-decahydronaphthalene, low molecular weight polyethylene wax, and mixtures thereof. In one example, the spinning solvent is selected from the group consisting of mineral oil, decalin, and mixtures thereof.

The extruder 102 (as illustrated in FIG. 1) to which the slurry is provided can be any suitable extruder, including for example a twin screw extruder such as an intermeshing co-rotating twin screw extruder. The gel spinning process can include extruding the slurry with the extruder 102 to form a mixture, preferably an intimate mixture, of the UHMWPE polymer and the spinning solvent. Extruding the slurry to form the mixture can be done at a temperature that is above the temperature at which the UHMWPE polymer will melt. The mixture of the UHMWPE polymer and the spinning solvent that is formed in the extruder 102 can thus be a liquid mixture of molten UHMWPE polymer and the spinning solvent. The temperature at which the liquid mixture of molten UHMWPE polymer and the spinning solvent is formed in the extruder can be from about 140° C. to about 320° C., preferably from about 220° C. to about 320° C., and more preferably from about 220° C. to about 280° C.

One example of a method for processing the slurry through the extruder is described in co-pending U.S. patent application Ser. No. 11/393,218 filed Mar. 30, 2006, the disclosure of which is incorporated herein by reference in its entirety, which describes that the capacity of an extruder scales as approximately the square of the screw diameter. A figure of merit for an extrusion operation is therefore the proportion between the polymer throughput rate and the square of the screw diameter. In at least one example, the slurry is processed such that the throughput rate of UHMWPE polymer in the liquid mixture of molten UHMWPE polymer and spinning solvent is at least the quantity 2.5 $D^2$ grams per minute (g/min), wherein D represents the screw diameter of the extruder in centimeters. For example, the throughput rate of UHMWPE polymer can be at least 4 $D^2$ g/min, at least 6 $D^2$ g/min, or at least 10 $D^2$g/min, at least 15.8 $D^2$g/min, at least 20 $D^2$g/min, at least 30 $D^2$ g/min, or at least 40 $D^2$ g/min Accordingly, the throughput rate of UHMWPE polymer can be from about 2.5 $D^2$ g/min to about 40 $D^2$ g/min, wherein D is the screw diameter of the extruder in centimeters.

In the present process, the average residence time of the UHMWPE and spinning solvent in the extruder 102 can be less than about 0.6 D, where D is the screw diameter in centimeters. In one example, the average residence time of the UHMWPE and spinning solvent in the extruder less than about 0.4D. The average residence time can be defined as the free volume of the extruder (barrel minus screw) divided by the volumetric throughput rate. For example, an average residence time in minutes can be calculated by dividing the free volume in $cm^3$ by the throughput rate in $cm^3$/min.

As illustrated in FIG. 1, after formation of the liquid mixture of UHMWPE and spinning solvent, the gel spinning process 100 can include passing the liquid mixture through a heated vessel 106 to form a solution of the UHMWPE and the spinning solvent. One example of forming a solution of UHMWPE and spinning solvent is described in co-pending U.S. patent application Ser. No. 11/393,218. The solution of the UHMWPE and the spinning solvent is preferably a uniform, homogeneous solution, in which the UHMWPE is dissolved in the spinning solvent. Operating conditions that can facilitate the formation of a homogeneous solution include, for example, (1) raising the temperature of the liquid mixture of the UHMWPE and the spinning solvent to a temperature near or above the melting temperature of the UHMWPE, and (2) maintaining the liquid mixture at said raised temperature for a sufficient amount of time to allow the spinning solvent to diffuse into the UHMWPE and for the UHMWPE to diffuse into the spinning solvent. When the solution is uniform, or sufficiently uniform, the final gel spun fiber can have improved properties, such as increased tenacity. One basic method of determining whether the solution is sufficiently uniform is by sampling a solution fiber as it leaves the spinneret as described below and drawing the solution fiber by hand, i.e. holding the sample fiber with two hands and stretching the sample fiber with both hands. If the solution is sufficiently uniform, the solution fiber sample stretched in this manner will typically have a smooth appearance. In contrast, a non-sufficiently uniform solution fiber sample stretched in this manner will typically have a bumpy appearance.

It is notable that the formation of a clear liquid including UHMWPE and spinning solvent is not equivalent to forming a homogeneous solution. For example, a study was conducted of a single ultrahigh molecular weight polyethylene particle of about 150 μm diameter in a static spinning solvent on a hot stage microscope (M. Rammoorthy, Honeywell International Inc., unpublished work). As the hot stage temperature approached the polyethylene melting point, the particle gradually seemingly "dissolved" at its outer fringes and then disappeared from view over a narrow temperature range and within a short time. However, when the hot stage was cooled down, the particle re-crystallized and reappeared. Apparently, the particle had simply melted without dissolving. In the molten state, the particle could not be see because the index of refraction of the molten polyethylene was very close to that of the solvent.

Referring back to FIG. 1, the liquid mixture of UHMW PE and spinning solvent that exits the extruder 102 can be passed via a pump 104, such as a positive displacement pump, to the heated vessel 106. The heated vessel 106 can include one or more mixers, which can be, for example, static mixers. The heated vessel 106 can be at any suitable temperature above the melting temperature of the UHMWPE. For example, heated vessel 106 can have a temperature of at least about 140° C. In one example, the heated vessel 106 can have a temperature of from about 220° C. to about 320° C., and preferably from about 220° C. to about 280° C. The heated vessel 106 can have a volume sufficient to provide an average residence time of the liquid mixture in the heated vessel 106 to form a solution of the UHMWPE in the solvent. For example, the residence time of the liquid mixture in the heated vessel 106 can be from about 2 minutes to about 120 minutes, preferably from about 6 minutes to about 60 minutes.

In an alternative example, the placement and utilization of the heated vessel and the extruder can be reversed in forming the solution of UHMWPE and spinning solvent. In such an example, a liquid mixture of UHMWPE and spinning solvent can be formed in a heated vessel, and can then be passed through an extruder to form a solution that includes the UHMWPE and the spinning solvent.

Next, the gel spinning process can include providing the solution of UHMWPE polymer and spinning solvent from the heated vessel 106 to a spinneret 108 that produces a solution fiber. The solution can be passed from the heated vessel 106 through a metering pump, such as a gear pump, and then to the spinneret 108. The process of providing the solution of UHMWPE polymer and spinning solvent from the heated vessel 106 to the spinneret 108 can include passing the solution of UHMWPE polymer and spinning solvent through a metering pump, which can be a gear pump. The solution fiber that issues from the spinneret 108 can include a plurality of solution filaments. The spinneret 108 can form a solution fiber having any suitable number of filaments, including for example, at least about 100 filaments, at least about 200 filaments, at least about 400 filaments, or at least about 800 filaments. In one example, the spinneret 108 can have from about 10 spinholes to about 3000 spinholes, and the solution fiber can comprise from about 10 filaments to about 3000 filaments. Preferably, the spinneret can have from about 100 spinholes to about 2000 spinholes and the solution fiber can comprise from about 100 filaments to about 2000 filaments. The spinholes can have a conical entry, with the cone having an included angle from about 15 degrees to about 75 degrees. Preferably, the included angle is from about 30 degrees to about 60 degrees. Additionally, following the conical entry, the spinholes can have a straight bore capillary extending to the exit of the spinhole. The capillary can have a length to diameter ratio of from about 10 to about 100, more preferably from about 15 to about 40.

The gel spinning process 100 can include drawing the solution fiber that issues from the spinneret 108 at a draw ratio of from about 1.1:1 to about 30:1 to form a drawn solution fiber. Drawing of the solution fiber can be accomplished by passing the solution fiber continuously through a gaseous zone 110 that can be, for example, a cooling chimney or a short gas-filled space. In some examples, the gaseous zone 110 can have a length of from about 0.3 centimeters to about 10 centimeters, and preferably from about 0.4 to about 5 centimeters. The gaseous zone 110 can be filled with an inert gas such as nitrogen, or, in examples where the residence time of the solution fiber in the gaseous zone 110 is less than about 1 second, the gaseous zone 110 can alternatively be filled with air. In examples where the gaseous zone 110 is a cooling chimney, a cooling gas can be used to cool the solution fiber and evaporate at least a portion of the spinning solvent.

The gel spinning process 100 can include cooling the drawn solution fiber to a temperature below the gel point of the UHMWPE polymer to form a gel fiber. The step of cooling can include quenching the drawn solution fiber in a liquid quench bath 112. The liquid in the liquid quench bath 112 can be selected from the group consisting of water, ethylene glycol, ethanol, iso-propanol, a water soluble anti-freeze, and mixtures thereof. The temperature of the liquid quench bath 112 can be from about −35° C. to about 35° C.

The gel spinning process 100 can include drawing the gel fiber in one or more stages at a first draw ratio DR1 of from about 1.1:1 to about 30:1. Drawing the gel fiber in one or more stages at the first draw ratio DR1 can be accomplished by passing the gel fiber through a first set of rolls (rollers) 114. Preferably, drawing the gel fiber at the first draw ratio DR1 can be conducted without applying heat to the fiber, and can be conducted at a temperature less than or equal to about 25° C.

Drawing the gel fiber can also include drawing the gel fiber at a second draw ratio DR2. Drawing the gel fiber at the second draw ratio DR2 can also include simultaneously removing spinning solvent from the gel fiber in a solvent removal device 116, sometimes referred to as a washer, to form a dry fiber. Accordingly, the second drawing step DR2 may be conducted in the solvent removal device (e.g. the washer). Drawing in the washer is preferred but not mandatory. Preferably, the gel fiber is drawn at a second draw ratio DR2 of about 1.5:1 to about 3.5:1, more preferably at about 1.5:1 to about 2.5:1, and most preferably at about a 2:1 draw ratio. Removal of the spinning solution can be accomplished by any suitable method, including, for example, drying, or by extracting the spinning solvent with a low boiling second solvent followed by drying. Extraction with a second solvent is conducted in a manner that replaces the first solvent in the gel with second solvent without significant changes in gel structure. Some swelling or shrinkage of the gel may occur, but preferably no substantial dissolution, coagulation or precipitation of the polymer occurs. When the first solvent is a hydrocarbon, suitable second solvents include hydrocarbons, chlorinated hydrocarbons, chlorofluorinated hydrocarbons and others, such as pentane, hexane, cyclohexane, heptane, toluene, methylene chloride, carbon tetrachloride, trichlorotrifluoroethane (TCTFE), diethyl ether, dioxane, dichloromethane and combinations thereof. Preferred low boiling second solvents are non-flammable volatile solvents having an atmospheric boiling point below about 80° C., more preferably below about 70° C. and most preferably below about 50° C. The most preferred second solvents are methylene chloride (B.P.=39.8° C.) and TCFE (B.P.=47.5° C.). Conditions of extraction should remove the first solvent to less than 1% of the total solvent in the gel. A preferred extraction method is described in detail in commonly owned U.S. Pat. No. 4,536,536, the disclosure of which is incorporated herein by reference.

The dry fiber can preferably include less than about 10 percent by weight of any solvent, including spinning solvent and any second solvent that is utilized in removing the spinning solvent. Preferably, the dry fiber can include less than about 5 weight percent of solvent, and more preferably less than about 2 weight percent of solvent.

The gel spinning process can also include drawing the dry fiber at a third draw ratio DR3 in at least one stage to form a partially oriented fiber. Drawing the dry fiber at the third draw ratio can be accomplished, for example, by passing the dry fiber through a draw stand 118. The third draw ratio can be from about 1.10:1 to about 3.00:1, more preferably from about 1.10:1 to about 2.00:1. Drawing the gel fiber and the dry fiber at draw ratios DR1, DR2 and DR3 can be done in-line. In one example, the combined draw of the gel fiber and the dry fiber, which can be determined by multiplying DR1, DR2 and DR3, and can be written as DR1×DR2×DR3:1 or (DR1)(DR2)(DR3):1, wherein DR1×DR2×DR3:1 can be at least about 5:1, preferably at least about 10:1, more preferably at least about 15:1, and most preferably at least about 20:1.

Preferably, the dry fiber is maximally drawn in-line until the last stage of draw is at a draw ratio of less than about 1.2:1. Optionally, the last stage of drawing the dry fiber can be followed by relaxing the partially oriented fiber from about 0.5 percent of its length to about 5 percent of its length.

The partially oriented fiber can have any suitable intrinsic viscosity. In some examples, the intrinsic viscosity of the partially oriented fiber can be greater than about 17 dl/g, and can be from about 17 dl/g to about 20 dl/g, including, but not limited to being about 18 dl/g, about 19 dl/g, or greater than about 19 dl/g. Additionally, the partially oriented fiber can have a tenacity of at least about 12 g/denier (10.8 g/dtex). Preferably, the partially oriented fiber can have a tenacity from about 12 g/denier (10.8 g/dtex) to about 25 g/denier (22.5 g/dtex), including, but not limited to being 13 g/denier (11.7 g/dtex), 14 g/denier (12.6 g/dtex), 15 g/denier (13.5 g/dtex), 16 g/denier (14.4 g/dtex), 17 g/denier (15.3 g/dtex), 18 g/denier (16.2 g/dtex), 19 g/denier (17.1 g/dtex), 20 g/denier (18 g/dtex), 21 g/denier (18.9 g/dtex), or about 22 g/denier (19.8 g/dtex), 23 g/denier (20.7 g/dtex), or 24 g/denier (21.6 g/dtex). In some examples, the partially oriented fiber can have a tenacity that is greater than about 25 g/denier (22.5 g/dtex) The tenacity of the partially oriented fiber can be measured in accordance with ASTM D2256-02 at a 10 inch (25.4 cm) gauge length and a strain rate of 100%/min.

The gel spinning process 100 as described above results in a continuous in-line production of the partially oriented fiber. In one example, the partially oriented fiber can be continuously produced at a rate of least about 0.35 g/min per filament of the partially oriented fiber, preferably at least about 0.60 g/min per filament, more preferably at least about 0.75 g/min per filament, and most preferably at least about 1.00 g/min per filament.

The gel spinning process 100 can also include winding the partially oriented fiber as fiber packages, or on a beam, with winders 120. Winding can preferably be accomplished without twist being imparted to the partially oriented fiber.

The gel spinning process 100 can also include transferring the partially oriented fiber to a post drawing operation 122. The post drawing operation can be discontinuous and separate from the in-line production of the partially oriented fiber. The post drawing operation can include unrolling the partially oriented fiber, and drawing the partially oriented fiber to form a highly oriented fiber product. Drawing of the partially oriented fiber to form a highly oriented fiber product can be accomplished in at least one stage, and can preferably be conducted in a heated environment provided by a heating apparatus, such as an oven, at a post drawing temperature of from about 125° C. to about 160° C. It should be noted that the partially oriented fiber generally is not drawn until it reaches the post drawing temperature. Drawing the partially oriented fiber to form a highly oriented fiber product can include drawing the partially oriented fiber when it is at the post drawing temperature to a fourth draw ratio DR4 of from about 1.8:1 to about 15:1 to form the highly oriented fiber product. The drawing rate of the partially oriented fiber during a post drawing operation is preferably a constant value. The drawing profile of the partially oriented fiber during a post drawing operation is preferably a straight line, with the slope of the drawing profile being a constant value. The drawing profile is the amount of change in the velocity of the partially oriented fiber divided by the amount of change in the distance traveled by the partially oriented fiber along the fiber path of the post drawing operation 122. The drawing profile is thus the slope of a graph of velocity versus distance, and can be written as $dV/dX$, where V is the velocity of the partially oriented fiber and X is the distance traveled by the partially oriented fiber.

The fractional post draw of the dry fiber, also referred to as the fractional post draw of the dry yarn (FOLDY) can be can be from about 0.75 to about 0.95. The FOLDY can be defined by the following equitation:

FOLDY=log (DR4)/log ((DR3)(DR4))

The post drawing operation can include drawing the partially oriented fiber in a forced convection oven, and preferably the drawing of the partially oriented fiber in the post drawing operation can be done in air. The post drawing operation can, for example, include the conditions described in U.S. Pat. Nos. 6,969,553, 7,370,395 or in U.S. Published Application Serial No. 2005/0093200, each of which is incorporated herein in its entirety.

Figure 2:
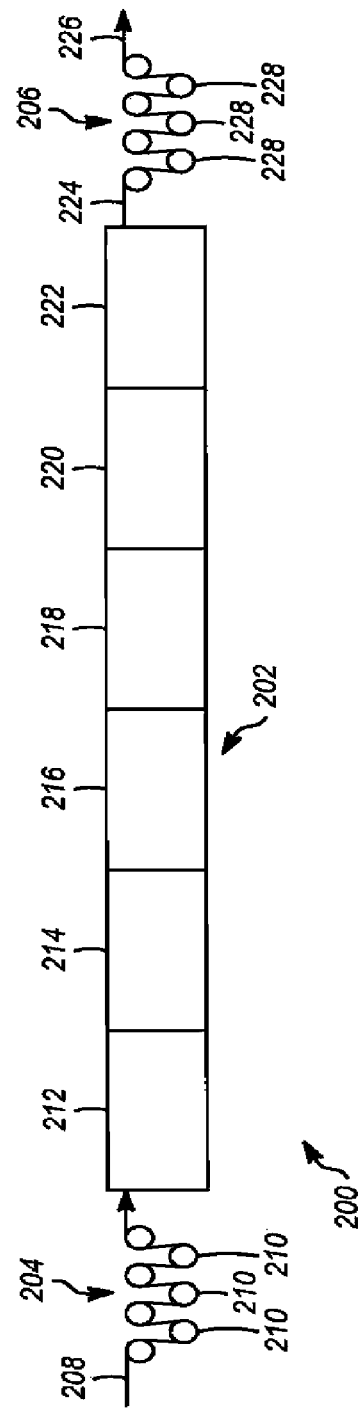
FIG. 2 illustrates one example of a post draw process that can be utilized in a process of FIG. 1.

One example of a post drawing process is illustrated in FIG. 2. The post drawing process 200 as illustrated includes a heating apparatus 202, a first set of rolls 204 that are external to the heating apparatus 202, and a second set of rolls 206 that are external to the heating apparatus 202. The partially oriented fiber 208 can be fed from a source and passed over the first set of rolls 204. The first set of rolls 204 can be driven rolls, which are operated to rotate at a desired speed to provide the partially oriented fiber 208 to the heating apparatus 202 at a desired feed velocity of $V_1$ meters/minute. The first set of rolls 204 can include a plurality of individual rolls 210. In one example, the first few individual rolls 210 are not heated, and the remaining individual rolls 210 are heated in order to preheat the filaments of the partially oriented fiber 208 before it enters the heating apparatus 202. Although the first set of rolls 204 includes a total of seven (7) individual rolls 210 as shown in FIG. 2, the number of individual rolls 210 can be higher or lower, depending upon the desired configuration.

The partially oriented fiber 208 can be fed into the heating apparatus 202, which can include one or more ovens. The one or more ovens can be adjacent horizontal ovens or can be vertically adjacent ovens. Each oven is preferably a forced convection air oven. Because it is desirable to have effective heat transmission between the partially oriented fiber 208 and the air in the one or more ovens, the air circulation within each oven is preferably in a turbulent state. The time-averaged air velocity within each oven in the vicinity of the partially oriented fiber 208 can preferably be from about 1 meter/minute to about 200 meters/minute, preferably from about 2 meters/minute to about 100 meters/minute, and more preferably from about 5 meters/minute to about 100 meters/minute. In the illustrated example of FIG. 2, six adjacent horizontal ovens 212, 214, 216, 218, 220, and 222 are shown, although any suitable number of ovens can be utilized, including, for example, one oven, two ovens, three ovens, four ovens, five ovens, seven ovens, eight ovens, or more than 8 ovens. The heating apparatus can have a total fiber path length of L meters. Each of the one or more ovens can each have any suitable length to provide the desired fiber path length. For example, each oven may be from about 10 feet to about 16 feet (3.05 meters to 4.88 meters) long, more preferably from about 11 feet to about 13 feet (3.35 meters to 3.96 meters) long. The temperature and speed of the partially oriented fiber 208 through the heating apparatus 202 can be varied as desired. For example, one or more temperature controlled zones may exist in the heating apparatus 202, with each zone having a temperature of from about 125° C. to about 160° C., more preferably from about 130° C. to about 160° C., or from about 150° C. to about 160° C. Preferably the temperature within a zone is controlled to vary less than ±2° C. (a total less than 4° C.), more preferably less than ±1° C. (a total less than 2° C.).

The path of the partially oriented fiber 208 in heating apparatus 202 can be an approximate straight line. The tension profile of the partially oriented fiber 208 during the post drawing process can be adjusted by adjusting the speed of the various rolls or by adjusting the temperature profile of the heating apparatus 202. For example, the tension of the partially oriented fiber 208 can be increased by increasing the difference between the speeds of consecutive driven rolls or decreasing the temperature in the heating apparatus 202. Preferably, the tension of the partially oriented fiber 208 in the heating apparatus 202 is approximately constant, or is increasing through the heating apparatus 202.

A heated fiber 224 exits the last oven 222 and can then be passed over the second set of rolls 206 to form the finished highly oriented fiber product 226. The second set of rolls 206 can be driven rolls, which are operated to rotate at a desired speed to remove the heated fiber 222 from the heating apparatus 202 at a desired exit velocity of $V_2$ meters/minute. The second set of rolls 206 can include a plurality of individual rolls 228. Although the second set of rolls 206 includes a total of seven (7) individual rolls 228 as shown in FIG. 2, the number of individual rolls 228 can be higher or lower, depending upon the desired configuration. Additionally, the number of individual rolls 228 in the second set of rolls 206 can be the same as or different than the number of individual rolls 210 in the first set of rolls 204. Preferably, the second set of rolls 206 can be cold, so that the finished highly oriented fiber product 226 is cooled to a temperature below at least about 90° C. under tension to preserve its orientation and morphology.

Figure 3:
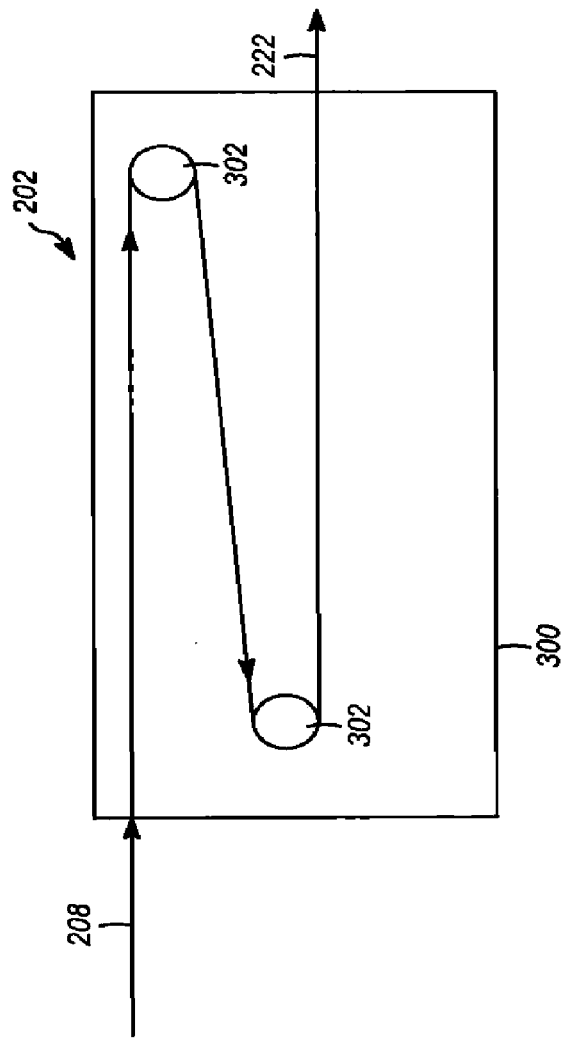
FIG. 3 illustrates one example of a heating apparatus that can be utilized in a post draw process of FIG. 2.

An alternative embodiment of the heating apparatus 202 is illustrated in FIG. 3. As shown in FIG. 3, the heating apparatus 202 can include one or more ovens, such as a single oven 300. Each oven is preferably a forced convection air oven having the same conditions as described above with reference to FIG. 2. The oven 300 can have any suitable length, and in one example can be from about 10 feet to about 20 feet (3.05 to 6.10 meters) long. The oven 300 can include one or more intermediate rolls 302, over which the partially oriented fiber 208 can be passed in the oven 300 to change its direction in order to increase the path of travel of the partially oriented fiber 208 within the heating apparatus 202. Each of the one or more intermediate rolls 302 can be a fixed roll that does not rotate, a driven roll that rotates at a predetermined speed, or an idler roll that can rotate freely as the partially oriented fiber 208 passes over it. Additionally, each of the one or more intermediate rolls 302 can be located internal to the oven 300, as shown, or alternatively one or more intermediate rolls 302 can be located external to the oven 300. Utilization of the one or more intermediate rolls 302 increases the effective length of the heating apparatus 202. Any suitable number of intermediate rolls can be utilized in order to provide the desired total fiber path length of L meters.

In one example, the feed velocity $V_1$ meters/minute, the exit velocity $V_2$ meters/minute, and the total fiber path length of L meters can be selected to satisfy each of the following equations (1) though (4):

$$0.25 < L/V_1 < 20, \text{minutes} \quad (1)$$

$$3 \leq V_2/V_1 \leq 20 \quad (2)$$

$$1.7 \leq (V_2-V_1) \leq 60, \text{minutes}^{-1} \quad (3)$$

$$0.20 \leq 2L/(V_2+V_1) \leq 10, \text{minutes} \quad (4)$$

The gel spinning process can include final steps of cooling the highly oriented fiber product under tension to form a cooled highly oriented fiber product produced, and winding up the cooled highly oriented fiber product produced. The highly oriented fiber product produced can have a tenacity of greater than about 45 g/denier (40.5 g/dtex), including, for example, from about 45 g/denier (40.5 g/dtex) to about 90 g/denier (63 g/dtex), or greater than about 90 g/denier (63 g/dtex). Additionally, the highly oriented fiber product produced can have a modulus greater than about 1400 g/d, including up to about 2000 g/d, or greater than about 2000 g/d. Further, in at least some examples, the highly oriented fiber product produced can have an intrinsic viscosity that is from about 0.2 times the intrinsic viscosity of the UHMWPE polymer from which the fiber was made to about 0.65 times the intrinsic viscosity of the UHMWPE polymer from which the fiber was made. For example, if the intrinsic viscosity of the UHMWPE is 30 dl/g, then the highly oriented fiber product produced therefrom can be from about 6 dl/g to about 19.5 dl/g.

The fibers described herein may be used to produce ballistic resistant composites and materials, and ballistic resistant articles from said composites and materials. For the purposes of the invention, ballistic resistant composites, articles and materials describe those which exhibit excellent properties against deformable projectiles, such as bullets, and against penetration of fragments, such as shrapnel. The invention particularly provides ballistic resistant composites formed from one or more fiber layers or fiber plies comprising fibers having a tenacity of about 45 g/denier or greater. The ballistic resistant composites may be woven or non-woven fabrics, and the fibers forming said fabrics may optionally be coated with a polymeric binder material.

A "fiber layer" as used herein may comprise a single-ply of unidirectionally oriented fibers, a plurality of non-consolidated plies of unidirectionally oriented fibers, a plurality of consolidated plies of unidirectionally oriented fibers, a woven fabric, a plurality of consolidated woven fabrics, or any other fabric structure that has been formed from a plurality of fibers, including felts, mats and other structures comprising randomly oriented fibers. A "layer" generally describes a generally planar arrangement. Each fiber layer will have both an outer top surface and an outer bottom surface. A "single-ply" of unidirectionally oriented fibers comprises an arrangement of non-overlapping fibers that are aligned in a unidirectional, substantially parallel array. This type of fiber arrangement is also known in the art as a "unitape" (unidirectional tape) and multiple non-woven plies may be combined to form a non-woven fabric. For example, multiple non-woven fiber plies may be formed into non-woven fabrics that comprise a plurality of stacked, overlapping fiber plies that are consolidated into a single-layer, monolithic element. A woven fabric or felt may also comprise a single fiber "ply". As used herein, an "array" describes an orderly arrangement of fibers or yarns, which is exclusive of woven fabrics, and a "parallel array" describes an orderly parallel arrangement of fibers or yarns. The term "oriented" as used in the context of "oriented fibers" refers to the alignment of the fibers as opposed to stretching of the fibers.

The term "fabric" describes structures that may include one or more fiber plies, with or without molding or consolidation of the plies, and may relate to a woven material, a non-woven material, or a combination thereof. A non-woven fabric formed from unidirectional fibers typically comprises a plurality of fiber plies stacked on each other and consolidated. When used herein, a "single-layer" structure refers to a monolithic structure composed of one or more individual plies, wherein multiple individual plies have been consolidated into a single unitary structure together with a polymeric binder material. By "consolidating" it is meant that the polymeric binder material together with each fiber ply is combined into a single unitary layer. Consolidation can occur via drying, cooling, heating, pressure or a combination thereof. Heat and/or pressure may not be necessary, as the fibers or fabric layers may just be glued together, as is the case in a wet lamination process. The term "composite" refers to combinations of fibers with at least one polymeric binder material. A "complex composite" as used herein refers to a consolidated combination of a plurality of fiber layers. As described herein, "non-woven" fabrics include all fabric structures that are not formed by weaving. For example, non-woven fabrics may comprise a plurality of unitapes that are at least partially coated with a polymeric binder material, stacked/overlapped and consolidated into a single-layer, monolithic element, as well as a felt or mat comprising non-parallel, randomly oriented fibers that are (preferably) coated with a polymeric binder composition.

As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in). Both the tenacity and tensile modulus of a fiber may be measured by ASTM D2256. As used herein, the terms "drawn" fibers or "drawing" fibers are known in the art, and are also known in the art as "oriented" or "orienting" fibers or "stretched" or "stretching" fibers. These terms are used interchangeably herein.

The filaments/fibers/yarns of the invention are preferably coated with a polymeric binder material, also commonly known in the art as a "polymeric matrix" material to form a fibrous composite. The terms "polymeric binder" and "polymeric matrix" are used interchangeably herein. These terms are conventionally known in the art and describe a material that binds fibers together either by way of its inherent adhesive characteristics or after being subjected to well known heat and/or pressure conditions. Such a "polymeric matrix" or "polymeric binder" material may also provide a fabric with other desirable properties, such as abrasion resistance and resistance to deleterious environmental conditions, so it may be desirable to coat the fibers with such a binder material even when its binding properties are not important, such as with woven fabrics.

When coating filaments/fibers/yarns with a polymeric binder, the polymeric binder coating is typically applied either simultaneously or sequentially to a plurality of fibers arranged as a fiber web (e.g. a parallel array or a felt) to form a coated web, as a woven fabric to form a coated woven fabric, or as another arrangement, wherein the fibers are thereby coated on, impregnated with, embedded in, or otherwise applied with the coating. The polymeric material may also be applied onto at least one array of fibers that is not part of a fiber web, followed by weaving the fibers into a woven fabric or followed by formulating a non-woven fabric following the methods described previously herein.

The fibers are preferably arranged into one or more fiber plies after the fibers are stretched and, if necessary, trimmed to the desired ply shape and size, and then multiple plies are aligned, stacked and consolidated following conventional techniques. In another technique, fibers are stretched, coated with a binder material, randomly arranged and consolidated to form a felt. Such techniques are well known in the art. When forming woven fabrics, the fibers are stretched prior to weaving and may be coated with the polymeric binder coating either prior to or after weaving, preferably after. Such techniques are well known in the art.

The woven or non-woven fabrics of the invention may be prepared using a variety of polymeric binder materials, including both low modulus, elastomeric materials and high modulus, rigid materials. As used herein throughout, the term tensile modulus means the modulus of elasticity as measured by ASTM 2256 for a fiber and by ASTM D638 for a polymeric binder material.

A low or high modulus binder may comprise a variety of polymeric and non-polymeric materials. A preferred polymeric binder comprises a low modulus elastomeric material. For the purposes of this invention, a low modulus elastomeric material has a tensile modulus measured at about 6,000 psi (41.4 MPa) or less according to ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature ($T_g$) of the elastomer is preferably less than about 0° C., more preferably the less than about −40° C., and most preferably less than about −50° C. The elastomer also has a preferred elongation to break of at least about 50%, more preferably at least about 100% and most preferably has an elongation to break of at least about 300%.

A wide variety of materials and formulations having a low modulus may be utilized as the polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, and combinations thereof, and other low modulus polymers and copolymers curable below the melting point of the fiber. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments.

The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Düsseldorf, Germany. Also preferred are polyurethane polymeric matrix binders within the range of both soft and rigid materials at a modulus ranging from about 2,000 psi (13.79 MPa) to about 8,000 psi (55.16 MPa).

The most preferred low modulus polymeric binder polymers are styrenic block copolymers sold under the trademark KRATON® commercially produced by Kraton Polymers, PRINLIN® styrene-isoprene-styrene (SIS) block copolymers, as well as polyurethane polymeric matrix binders having a modulus ranging from about 2,000 psi (13.79 MPa) to about 8,000 psi (55.16 MPa).

Preferred high modulus, rigid materials generally have a higher initial tensile modulus than 6,000 psi. Preferred high modulus, rigid polymeric binder materials useful herein include materials such as a vinyl ester polymer or a styrene-butadiene block copolymer, and also mixtures of polymers such as vinyl ester and diallyl phthalate or phenol formaldehyde and polyvinyl butyral. A particularly preferred rigid polymeric binder material for use in this invention is a thermosetting polymer, preferably soluble in carbon-carbon saturated solvents such as methyl ethyl ketone, and possessing a high tensile modulus when cured of at least about $1 \times 10^6$ psi (6895 MPa) as measured by ASTM D638. Particularly preferred rigid polymeric binder materials are those described in U.S. Pat. No. 6,642,159, the disclosure of which is incorporated herein by reference. The polymeric binder, whether a low modulus material or a high modulus material, may also include fillers such as carbon black or silica, may be extended with oils, or may be vulcanized by sulfur, peroxide, metal oxide or radiation cure systems as is well known in the art.

In addition to the non-woven fiber layers, the woven fiber layers are also preferably coated with the polymeric binder. Preferably the fibers comprising the woven fiber layers are at least partially coated with a polymeric binder, followed by a consolidation step similar to that conducted with non-woven fiber layers. Such a consolidation step may be conducted to merge multiple woven fiber layers with each other, or to further merge the binder with the fibers of said woven fabric. However, coating the woven fiber layers with a polymeric binder is not required. For example, a plurality of woven fiber layers do not necessarily have to be consolidated, and may be attached by other means, such as with a conventional adhesive, or by stitching.

Generally, a polymeric binder coating is necessary to efficiently merge, i.e. consolidate, a plurality of non-woven fiber plies. The polymeric binder material may be applied onto the entire surface area of the individual fibers or only onto a partial surface area of the fibers. Most preferably, the coating of the polymeric binder material is applied onto substantially all the surface area of each individual fiber forming a woven or non-woven fabric of the invention. Where the fabrics comprise a plurality of yarns, each fiber forming a single strand of yarn is preferably coated with the polymeric binder material. However, as is the case with woven fabric substrates, non-woven fabrics may also be coated with additional polymeric binder/matrix materials after the aforementioned consolidation/molding steps onto one or more surfaces of the fabric as may be desired by one skilled in the art.

The rigidity, impact and ballistic properties of the articles formed from the fabric composites of the invention are affected by the tensile modulus of the polymeric binder polymer coating the fibers. For example, U.S. Pat. No. 4,623,574 discloses that fiber reinforced composites constructed with elastomeric matrices having tensile moduli less than about 6,000 psi (41,300 kPa) have superior ballistic properties compared both to composites constructed with higher modulus polymers, and also compared to the same fiber structure without a polymeric binder material. However, low tensile modulus polymeric binder material polymers also yield lower rigidity composites. Further, in certain applications, particularly those where a composite must function in both anti-ballistic and structural modes, there is needed a superior combination of ballistic resistance and rigidity. Accordingly, the most appropriate type of polymeric binder polymer to be used will vary depending on the type of article to be formed from the fabrics of the invention. In order to achieve a compromise in both properties, a suitable polymeric binder may combine both low modulus and high modulus materials to form a single polymeric binder.

For the purposes of the present invention, the term "coated" as used herein is not intended to limit the method by which the polymer layers are applied onto the filament/fiber surface. Any appropriate application method may be utilized where the polymeric binder material layer is applied directly onto the fiber surfaces. Accordingly, the fibers of the invention may be coated on, impregnated with, embedded in, or otherwise applied with the polymeric binder material. The polymeric binder materials are preferably applied directly to the fiber or fibers using any appropriate method that would be readily determined by one skilled in the art. For example, the polymeric binder materials may be applied in solution form by spraying, extruding or roll coating a solution of the polymer material onto fiber surfaces, wherein a portion of the solution comprises the desired polymer or polymers and a portion of the solution comprises a solvent capable of dissolving or dispersing the polymer or polymers, followed by drying. Alternately, the polymeric binder material may be extruded onto the fibers using conventionally known techniques, such as through a slot-die, or through other techniques such as direct gravure, Meyer rod and air knife systems, which are well known in the art. Another method is to apply a neat polymer of the binder material onto fibers either as a liquid, a sticky solid or particles in suspension or as a fluidized bed. Alternatively, the coating may be applied as a solution, emulsion or dispersion in a suitable solvent which does not adversely affect the properties of fibers at the temperature of application. For example, the fibers can be transported through a solution of the polymeric binder material to substantially coat the fibers and then dried.

In another coating technique, the fibers may be dipped into a bath of a solution containing the polymeric binder material dissolved or dispersed in a suitable solvent, and then dried through evaporation or volatilization of the solvent. This method preferably at least partially coats each individual fiber with the first polymeric material, preferably substantially coating or encapsulating each of the individual fibers and covering all or substantially all of the filament/fiber surface area with the polymeric binder material. The dipping procedure may be repeated several times as required to place a desired amount of polymer material onto the fibers.

Other techniques for applying a coating to the fibers may be used, including coating of the gel fiber precursor before the fibers are subjected to the stretching operation, either before or after removal of the solvent from the fiber, as per the gel spinning technique. The fiber may is then stretched at elevated temperatures in accordance with the preferred process of the invention. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fibers may be extruded into a fluidized bed of an appropriate polymeric powder.

As stated herein, the fibers may be coated with the polymeric binder either prior to stretching the fibers or after stretching the fibers. Additionally, the fibers may be coated with the binder either before or after the fibers are arranged into one or more plies/layers, or before or after the fibers are woven into a woven fabric. Accordingly, it should be understood that in embodiments where the optional polymeric binder is incorporated, the invention is not intended to be limited by the stage at which the polymeric binder is applied to the fibers, nor by the means used to apply the polymeric binder.

Methods for the production of non-woven fabrics are well known in the art. In the preferred embodiments herein, a plurality of fibers are arranged into at least one array, typically being arranged as a fiber web comprising a plurality of fibers aligned in a substantially parallel, unidirectional array. In a typical process for forming non-woven unidirectionally aligned fiber plies, fiber bundles are supplied from a creel and led through guides and one or more spreader bars into a collimating comb, followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. At this point, scouring the fibers before or during this spreading step may enhance and accelerate the spreading of the fibers into such a parallel array. Fiber scouring is a process in which fibers (or fabric) are passed through a chemical solution which removes any of the undesirable residual fiber finish (or weaving aid) that may have been applied to the fibers during or after fabrication. Fiber scouring may also improve the bond strength of a subsequently applied polymeric binder material (or a subsequently applied protective film) on the fibers, and accordingly, less binder may be needed. By reducing amount of binder, a greater number of fibers may be included in a fabric, producing a lighter ballistic material with improved strength. This also leads to increased projectile engagement with the fibers, improved stab resistance of resulting fabric composites and an increased resistance of the composites against repeated impacts. Following fiber spreading and collimating, the fibers of such a parallel array typically contain from about 3 to 12 fiber ends per inch (1.2 to 4.7 ends per cm), depending on the filament/fiber thickness.

After the fibers are coated with the binder material as discussed herein, the coated fibers are formed into non-woven fabrics that comprise a plurality of overlapping, non-woven fiber plies that are consolidated into a single-layer, monolithic element. As stated previously, each ply comprises an arrangement of non-overlapping fibers that are aligned in a unidirectional, substantially parallel array.

In a preferred non-woven fabric structure of the invention, a plurality of stacked, overlapping unitapes are formed wherein the parallel fibers of each single ply (unitape) are positioned orthogonally (0°/90°) to the parallel fibers of each adjacent single ply relative to the longitudinal fiber direction of each single ply. The stack of overlapping non-woven fiber plies is consolidated under heat and pressure, or by adhering the coatings of individual fiber plies, to form a single-layer, monolithic element which has also been referred to in the art as a single-layer, consolidated network where a "consolidated network" describes a consolidated (merged) combination of fiber plies with a polymeric matrix/binder. Articles of the invention may also comprise hybrid consolidated combinations of woven fabrics, non-woven fabrics formed from unidirectional fiber plies and non-woven felt fabrics.

As is conventionally known in the art, excellent ballistic resistance is achieved when individual fiber plies are cross-plied such that the fiber alignment direction of one ply is rotated at an angle with respect to the fiber alignment direction of another ply. Most preferably, the fiber plies are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles.

Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

Most typically, non-woven fabrics include from 1 to about 6 plies, but may include as many as about 10 to about 20 plies as may be desired for various applications. The greater the number of plies translates into greater ballistic resistance, but also greater weight. Accordingly, the number of fiber plies forming a fabric or an article of the invention varies depending upon the ultimate use of the fabric or article. For example, in body armor vests for military applications, in order to form an article composite that achieves a desired 1.0 pound per square foot or less areal density (4.9 kg/m$^2$), a total of about 100 plies (or layers) to about 50 individual plies (or layers) may be required, wherein the plies/layers may be woven, knitted, felted or non-woven fabrics (with parallel oriented fibers or other arrangements) formed from the high-strength fibers described herein. In another embodiment, body armor vests for law enforcement use may have a number of plies/layers based on the National Institute of Justice (NIJ) Threat Level. For example, for an NIJ Threat Level IIIA vest, there may be a total of 40 plies. For a lower NIJ Threat Level, fewer plies/layers may be employed.

Methods of consolidating fabrics or fiber plies are well known, such as by the methods described in U.S. Pat. No. 6,642,159. Consolidation can occur via drying, cooling, heating, pressure or a combination thereof. Heat and/or pressure may not be necessary, as the fibers or fabric layers may just be glued together, as is the case in a wet lamination process. Typically, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material is caused to melt, relatively little pressure is required to form the composite, while if the binder material is only heated to a sticking point, more pressure is typically required. As is conventionally known in the art, consolidation may be conducted in a calender set, a flat-bed laminator, a press or in an autoclave.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~121° C.). The pressure under which the fabrics of the invention are molded has a direct effect on the stiffness or flexibility of the resulting molded product. Particularly, the higher the pressure at which the fabrics are molded, the higher the stiffness, and vice-versa. In addition to the molding pressure, the quantity, thickness and composition of the fabric plies and polymeric binder coating type also directly affects the stiffness of the articles formed from the inventive fabrics. Most commonly, a plurality of orthogonal fiber webs are "glued" together with the binder polymer and run through a flat bed laminator to improve the uniformity and strength of the bond.

While each of the molding and consolidation techniques described herein are similar, each process is different. Particularly, molding is a batch process and consolidation is a continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber type. The fabrics of the invention may also optionally be calendered under heat and pressure to smooth or polish their surfaces. Calendering methods are well known in the art.

Woven fabrics may be formed using techniques that are well known in the art using any fabric weave, such as plain weave, crowfoot weave, basket weave, satin weave, twill weave and the like. Plain weave is most common, where fibers are woven together in an orthogonal 0°/90° orientation. Either prior to or after weaving, the individual fibers of each woven fabric material may or may not be coated with the polymeric binder material. In another embodiment, a hybrid structure may be assembled where both woven and non-woven fabrics are combined and interconnected, such as by consolidation as described herein.

To produce a fabric article having sufficient ballistic resistance properties, the total weight of the binder/matrix coating preferably comprises from about 2% to about 50% by weight, more preferably from about 5% to about 30%, more preferably from about 7% to about 15% and most preferably from about 11% to about 16% by weight of the fibers plus the weight of the coating, wherein 16% is most preferred for non-woven fabrics. A lower binder/matrix content is appropriate for woven fabrics, wherein a polymeric binder content of greater than zero but less than 10% by weight of the fibers plus the weight of the coating is most preferred.

The thickness of the individual fabrics will correspond to the thickness of the individual fibers and the number of fiber layers incorporated into a fabric. A preferred woven fabric will have a preferred thickness of from about 25 μm to about 500 μm per layer, more preferably from about 50 μm to about 385 μm and most preferably from about 75 μm to about 255 μm per layer. A preferred non-woven fabric, i.e. a non-woven, single-layer, consolidated network, will have a preferred thickness of from about 12 μm to about 500 μm, more preferably from about 50 μm to about 385 μm and most preferably from about 75 μm to about 255 μm, wherein a single-layer, consolidated network typically includes two consolidated plies (i.e. two unitapes). While such thicknesses are preferred, it is to be understood that other thicknesses may be produced to satisfy a particular need and yet fall within the scope of the present invention.

Following weaving or consolidation of the fiber layers, an optional polymer layer may be attached to each of the outer surfaces of the fabrics via conventional methods. Suitable polymers for said polymer layer non-exclusively include thermoplastic and thermosetting polymers. Suitable thermoplastic polymers non-exclusively may be selected from the group consisting of polyolefins, polyamides, polyesters, polyurethanes, vinyl polymers, fluoropolymers and co-polymers and mixtures thereof. Of these, polyolefin layers are preferred. The preferred polyolefin is a polyethylene. Non-limiting examples of polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred polyethylene is LLDPE. Suitable thermosetting polymers non-exclusively include thermoset allyls, aminos, cyanates, epoxies, phenolics, unsaturated polyesters, bismaleimides, rigid polyurethanes, silicones, vinyl esters and their copolymers and blends, such as those described in U.S. Pat. Nos. 6,846,758, 6,841,492 and 6,642,159, all of which are incorporated herein by reference to the extent not incompatible herewith. As described herein, a polymer film includes polymer coatings. Also suitable as outer polymer films are ordered discontinuous thermoplastic nets, and non-woven discontinuous fabrics or scrims. Examples are heat-activated, non-woven, adhesive webs such as SPUNFAB® webs, commercially available from Spunfab, Ltd, of Cuyahoga Falls, Ohio (trademark registered to Keuchel Associates, Inc.); THERMOPLAST™ and HELIOPLAST™ webs, nets and films, commercially available from Protechnic S.A. of Cernay, France, as well as others.

The polymer film layers are preferably attached to the single-layer, consolidated network using well known lamination techniques. Typically, laminating is done by positioning the individual layers on one another under conditions of sufficient heat and pressure to cause the layers to combine into a unitary film. The individual layers are positioned on one another, and the combination is then typically passed through the nip of a pair of heated laminating rolls by techniques well known in the art. Lamination heating may be done at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. If included, the polymer film layers preferably comprise from about 2% to about 25% by weight of the overall fabric, more preferably from about 2% to about 17% percent by weight of the overall fabric and most preferably from 2% to 12%. The percent by weight of the polymer film layers will generally vary depending on the number of fabric layers included. Further, while the consolidation and outer polymer layer lamination steps are described herein as two separate steps, they may alternately be combined into a single consolidation/lamination step via conventional techniques in the art.

The polymer film layers are preferably very thin, having preferred layer thicknesses of from about 1 µm to about 250 µm, more preferably from about 5 µm to about 25 µm and most preferably from about 5 µm to about 9 µm. The thickness of the individual fabric layers will correspond to the thickness of the individual fibers.

While such thicknesses are preferred, it is to be understood that other film thicknesses may be produced to satisfy a particular need and yet fall within the scope of the present invention.

The fabrics of the invention also exhibit good peel strength. Peel strength is an indicator of bond strength between fiber layers. As a general rule, the lower the matrix polymer content, the lower the bond strength, but the higher the fragment resistance of the material. However, below a critical bond strength, the ballistic material loses durability during material cutting and assembly of articles, such as a vest, and also results in reduced long term durability of the articles. In the preferred embodiment, the peel strength for the inventive fabrics in a SPECTRA® Shield) (0°,90°) type configuration is preferably at least about 0.17 lb/ft$^2$, more preferably at least about 0.188 lb/ft$^2$, and more preferably at least about 0.206 lb/ft$^2$. It has been found that the best peel strengths are achieved for fabrics of the invention having at least about 11%.

The fabrics of the invention will have a preferred areal density of from about 20 grams/m$^2$ (0.004 lb/ft$^2$ (psf)) to about 1000 gsm (0.2 psf). More preferable areal densities for the fabrics of this invention will range from about 30 gsm (0.006 psf) to about 500 gsm (0.1 psf). The most preferred areal density for fabrics of this invention will range from about 50 gsm (0.01 psf) to about 250 gsm (0.05 psf). Articles of the invention comprising multiple individual layers of fabric stacked one upon the other will further have a preferred areal density of from about 1000 gsm (0.2 psf) to about 40,000 gsm (8.0 psf), more preferably from about 2000 gsm (0.40 psf) to about 30,000 gsm (6.0 psf), more preferably from about 3000 gsm (0.60 psf) to about 20,000 gsm (4.0 psf), and most preferably from about 3750 gsm (0.75 psf) to about 10,000 gsm (2.0 psf).

The fabrics of the invention may be used in various applications to form a variety of different ballistic resistant articles using well known techniques. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in a military and peace keeping missions.

As used herein, "soft" or "flexible" armor is armor that does not retain its shape when subjected to a significant amount of stress. The structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus binder material. Hard articles like helmets and armor are preferably, but not exclusively, formed using a high tensile modulus binder material.

Ballistic resistance properties are determined using standard testing procedures that are well known in the art. Particularly, the protective power or penetration resistance of a ballistic resistant composite is normally expressed by citing the impacting velocity at which 50% of the projectiles penetrate the composite while 50% are stopped by the composite, also known as the $V_{50}$ value. As used herein, the "penetration resistance" of an article is the resistance to penetration by a designated threat, such as physical objects including bullets, fragments, shrapnel and the like. For composites of equal areal density, which is the weight of the composite divided by its area, the higher the $V_{50}$, the better the ballistic resistance of the composite.

The penetration resistance for designated threats can also be expressed by the total specific energy absorption ("SEAT") of the ballistic resistant material. The total SEAT is the kinetic energy of the threat divided by the areal density of the composite. The higher the SEAT value, the better the resistance of the composite to the threat. The ballistic resistant properties of the articles of the invention will vary depending on many factors, particularly the type of fibers used to manufacture the fabrics, the percent by weight of the fibers in the composite, the suitability of the physical properties of the coating materials, the number of layers of fabric making up the composite and the total areal density of the composite.

The following examples serve to illustrate the invention:

EXAMPLE 1

Post Draw Residence Time

It has been found that the production of highly oriented fibers having increased tenacity is partially a function of the post draw drawing rate and drawing profile. For example, a slower post draw drawing rate can generally produce a highly oriented fiber having a greater tenacity. Samples of partially oriented fiber having an intrinsic viscosity of 18.5 dl/g produced in accordance with the process described above utilizing a UHMWPE polymer having an intrinsic viscosity of 33 dl/g, and an extruder temperature of 240° C., were each drawn in a post draw process. The post draw process had either a single pass (Std) or multiple passes (MP) through a heating apparatus at a temperature of either 150° C. or 152° C. The maximum draw ratio of the partially oriented fiber in the single pass runs was from about 3.0 to about 3.9 for the single pass (Std) runs, with a higher draw ratio resulting in fiber breakage. For multiple pass (MP) runs, the maximum draw ratio was determined to be from about 4.5 to about 6.0.

Figure 4:
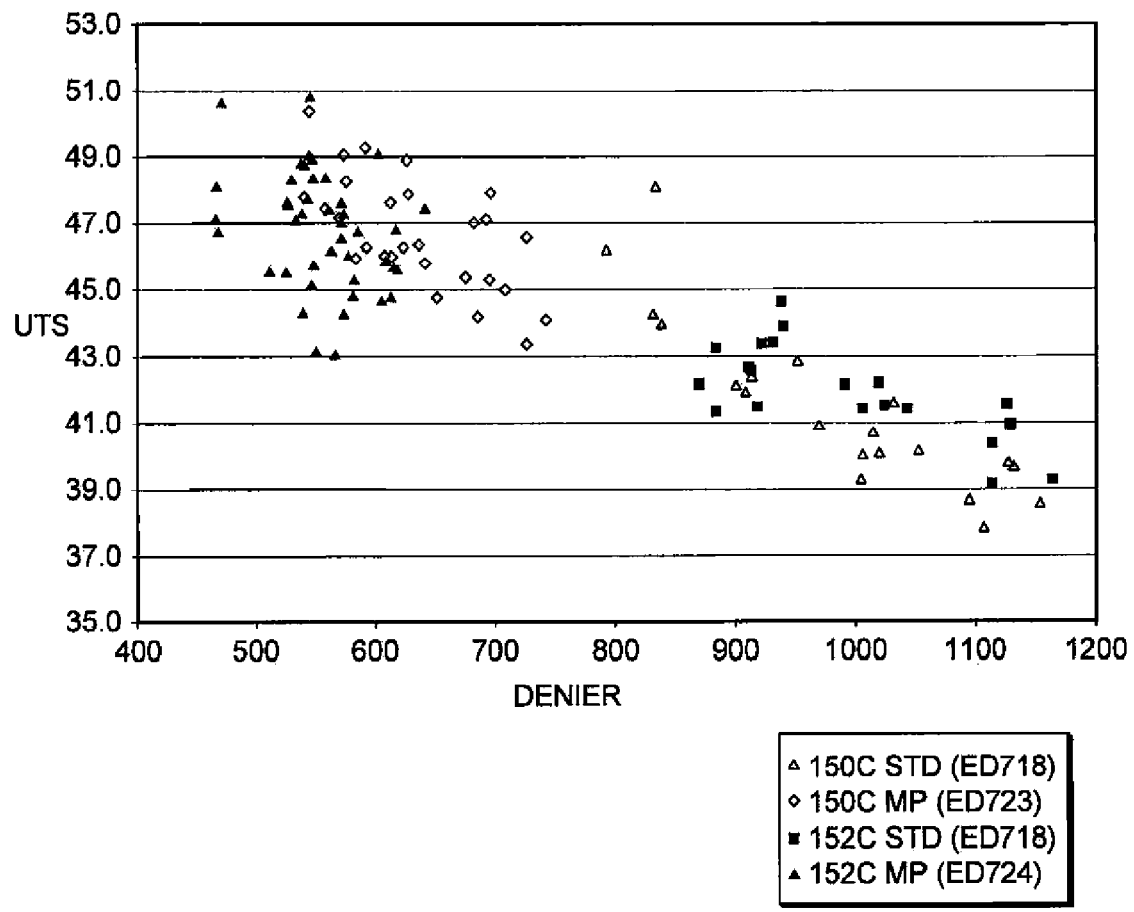
FIG. 4 illustrates a graph of test results for various UHMWPE gel spun yarns.

FIG. 4 is a graph that provides test results indicating the tenacity of the highly oriented fibers produced by these processes. Specifically, FIG. 4 is a graph of the tenacity (UTS) versus the draw ratio in deniers. As can be seen in FIG. 4, the tenacity of the highly oriented fiber produced by post draw processes at either 150° C. or 152° C. was greater for the fibers that underwent multiple passes through the heating apparatus.

EXAMPLE 2

Gel Spun Fibers

A solution including a spinning solvent and an UHMWPE polymer having an intrinsic viscosity of about 60 dl/g is formed from a slurry comprising a UHMWPE polymer and a spinning solvent, with the extruder temperature at 280° C. and the temperature of the heated vessel at 290° C. The concentration of the UHMWPE polymer in the slurry entering the extruder is about 6% and the temperature of the slurry is about 100° C. After forming a homogenous spinning solution inside the extruder and the heated vessel, the solution is spun through a 181 hole spinneret with a spinneret diameter of 0.35 mm and an L/D of 30:1. A 0.75 inch air gap is present between the spinneret and a water quench bath located below the spinneret. The solution fiber is stretched in the 0.75 inch (1.9 cm) air gap at a draw ratio of about 2:1 and then quenched in the water bath having a water temperature of about 10° C. The gel fiber is cold stretched with sets of rolls at a 3:1 draw ratio before entering into a solvent removal device. In the solvent removal device, the gel fiber is drawn at about a 2:1 draw ratio. The resulting dry fiber is drawn by four sets of rolls at three stages to form a partially oriented fiber with a tenacity of about 40 g/d. The partially oriented fiber is drawn at 152° C. with 5 passes within a 25 meter oven. The feed speed of the partially oriented fiber is adjusted so that the residence time for drawing achieves the maximum draw ratio of greater than about 10:1. The tenacity of the highly oriented fiber product is about 90 g/d, with a modulus of about 2000 g/d.

EXAMPLE 3

Ballistic Testing

Ballistic articles, such as soft or hard armor can be made from gel spun fibers. In this example, soft armor and hard armor composite panels were constructed from gel-spun UHMWPE fibers. The fiber utilized in the Control Sample had a tenacity of 37.5 g/denier and a modulus of 1350 g/denier. The fiber utilized in the Test Sample, which was made in accordance with the processes described herein, had a tenacity of 45 g/denier and a modulus of 1450 g/denier. The Test Samples and Control Samples were constructed with the same fiber volume fraction and the same matrix resin. The protective power of a structure can be expressed by citing the impact velocity at which 50% of the projectiles are stopped, and is designated the $V_{50}$ value, which is expressed in feet per second. The $V_{50}$ values of the composite panels were tested for various types of ballistic threats, and the test results are provided in Table 1 below.

TABLE 1

| Ballistic Threat | Test Sample (ADC 0.76 psf) | Control Sample (ADC 0.76 psf) |
|---|---|---|
| Soft Armor | | |
| 9 mm FMJ | 1884 | 1730 |
| .357 Mag JSP | 1758 | 1630 |
| .44 Mag SJHP | 1642 | 1530 |
| Ballistic Threat | Test Sample | Control Sample |
| Hard Armor | | |
| 17 gr FSP (ADC 1.0 psf) | 2079 | 1910 |
| M80 Ball (ADC 3.5 psf) | 3047 | 2768 |
| 7.62 × 39 MSC (ADC 2.5 psf) | 2449 | 1832 |

ADC = Areal Density of the Composite.
psf = pounds per square foot (lb/ft$^2$).

As can be seen from the test results, the Test Sample armor made from the gel spun fiber having a 45 g/denier tenacity had a higher performance than the Control Sample armor made from gel-spun fiber having a 37.5 g/denier tenacity. Useful conditions for producing articles from the fibers disclosed herein are also described in U.S. Pat. No. 7,919,418, which is incorporated herein by reference in its entirety.

EXAMPLE 4

Extended chain polyethylene fibers of the invention having a tenacity of 45 g/denier were arranged to form non-woven, unidirectional fiber plies, i.e. unidirectional tapes. Each ply comprised a conventional arrangement of generally parallel filaments. The fibers in each ply were coated (impregnated) with an aqueous thermoplastic styrene-isoprene-styrene (SIS) block copolymer resin sold under the trademark KRATON® commercially produced by Kraton Polymers of Houston, Tex.

Four of said plies (unidirectional tapes) were stacked on top of each other and consolidated in a conventional 0°/90°/0°/90° cross-plied configuration. The four-ply structure was produced by first consolidating two single plies (two unidirectional tapes) by lamination to form a first 2-ply 0°/90° cross-plied layer. This was then repeated to form a substantially similar second 2-ply 0°/90° cross-plied layer. The first and second 2-ply 0°/90° cross-plied layers were then consolidated to form the 4-ply 0°/90°/0°/90° cross-plied fiber layer. A polymer film having a thickness of approximately 8.9 μm was then attached to each of the top and bottom outer surfaces of the 4-ply fiber layer by lamination. The polymer film was LLDPE. The total areal density of the 4-ply structure including the polymer film was 5.22 oz/yd²±0.24 oz/yd² (177 g/m²±8 g/m²). The fiber areal density of the component fibers was 4.07 oz/yd²±0.18 oz/yd² (138 g/m²±6 g/m²). The fiber denier was 970 (240 filaments).

The SIS KRATON® resin comprised approximately 15.0% (+3.0/−2.0) percent by weight of each unitape. The 4-ply structure had a nominal thickness of approximately 0.36 mm

EXAMPLE 5

Example 4 is repeated with PRINLIN® styrene-isoprene-styrene (SIS) block copolymer (PRINLIN® B7137HV), commercially available from Henkel Technologies, replacing the SIS KRATON® resin. PRINLIN® B7137HV is a water based dispersion of KRATON® D1107 styrene-isoprene-styrene resin block copolymer. PRINLIN® B7137HV is described by its manufacturer as comprising, by weight, 68.7% KRATON® D1107, 22.7% of a wood rosin derivative as a resin modifier, 3.9% of a nonionic surfactant, 2.1% of an anionic surfactant, 2.3% of an antioxidant and 0.3% of sodium hydroxide, and a viscosity at 77° F. (25° C.) of 400 cps. Following coating the fibers with the resin composition, the water is evaporated from the resin composition and the fiber network is wound up on a roll. Continuous rolls of unidirectional fiber pre-pregs are prepared by coating parallel fibers with the resin. Unitapes are formed from said unidirectional fiber pre-pregs. The unitapes are cross-plied at 90° as is conventional in the art and consolidated under conventional heat and pressure conditions to create a 2-ply 0°/90° laminate. Two such two-ply consolidated structures are then cross-plied once again at 90° and consolidated under heat and pressure to form a 4-ply 0°/90°/0°/90° fibrous composite. The four-ply consolidated layers are sandwiched between two LLDPE films having a thickness of approximately 0.35 mil (8.9 μm) under heat and pressure.

EXAMPLE 6

Example 4 is repeated but where each two-ply consolidated layer is sandwiched between two LLDPE films having a thickness of approximately 0.35 mil (8.9 μm) under heat and pressure prior to consolidating two of said 2-ply layers to form a 4-ply layer.

EXAMPLE 7

Example 5 is repeated but where each two-ply consolidated layer is sandwiched between two LLDPE films having a thickness of approximately 0.35 mil (8.9 μm) under heat and pressure prior to consolidating two of said 2-ply layers to form a 4-ply layer.

EXAMPLES 8-11

Examples 4-7 are repeated using a thermoplastic polyurethane resin rather than the KRATON® or PRINLIN® resins.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above and all equivalents thereto.

What is claimed is:

1. A fiber comprising ultra high molecular weight polyethylene (UHMWPE) having a tenacity of at least about 45 g/denier (40.5 g/dtex) and a tensile modulus of at least about 1400 g/denier, said fiber being produced by a process comprising the steps of:

a) feeding a slurry that comprises an UHMWPE polymer and a spinning solvent to an extruder to produce a liquid mixture, the UHMWPE polymer having an intrinsic viscosity (IV) in decalin at 135° C. of at least about 30 dl/g; or feeding the UHMWPE polymer and spinning solvent into an extruder and forming both a slurry and a liquid mixture inside the extruder; wherein a 10 wt. % solution of said UHMWPE dissolved in mineral oil at 250° C. has a Cogswell extensional viscosity ($\lambda$) in accordance with the formula:

$$\lambda \geq 5{,}917(IV)^{0.8};$$

b) passing the liquid mixture through a heated vessel to form a homogeneous solution comprising the UHMWPE polymer and the spinning solvent;

c) providing the solution from the heated vessel to a spinneret to form a solution fiber;

d) drawing the solution fiber that issues from the spinneret at a draw ratio of from about 1.1:1 to about 30:1 to form a drawn solution fiber;

e) cooling the drawn solution fiber to a temperature below the gel point of the UHMWPE polymer to form a gel fiber;

f) drawing the gel fiber in one or more stages at a first draw ratio DR1 of from about 1.1:1 to about 30:1;

g) drawing the gel fiber at a second draw ratio DR2;

h) removing spinning solvent from the gel fiber in a solvent removal device to form a dry fiber;

i) drawing the dry fiber at a third draw ratio DR3 in at least one stage to form a partially oriented fiber; the partially oriented fiber having an intrinsic viscosity of greater than about 19 dl/g;

j) transferring the partially oriented fiber to a post drawing operation; and k) drawing the partially oriented fiber at a post drawing temperature in the post drawing operation to a fourth draw ratio DR4 of from about 1.8:1 to about 15:1 to form a highly oriented fiber product having a tenacity of at least about 45 g/denier (40.5 g/dtex).

2. The fiber of claim 1 wherein the UHMWPE polymer forming the slurry of step a) has an intrinsic viscosity of greater than about 30 dl/g.

3. The fiber of claim 1 wherein the highly oriented fiber product has an intrinsic viscosity that is from about 0.2 times the intrinsic viscosity of the UHMWPE to about 0.65 times the intrinsic viscosity of the UHMWPE polymer.

4. The fiber of claim 1 wherein the spinning solvent is selected from the group consisting of halogenated hydrocarbons, mineral oil, decalin, tetralin, naphthalene, xylene, toluene, dodecane, undecane, decane, nonane, octene, cis-decahydronaphthalene, trans-decahydronaphthalene, low molecular weight polyethylene wax, and mixtures thereof.

5. The fiber of claim 1 wherein the spinning solvent is selected from the group consisting of mineral oil, decalin, and mixtures thereof.

6. The fiber of claim 1 wherein the partially oriented fiber has a tenacity from about 12 g/denier (10.8 g/dtex) to about 25 g/denier (22.5 g/dtex).

7. The fiber of claim 1 wherein said fiber has a tensile modulus of at least about 1400 g/denier.

8. A multi-fiber yarn comprising a plurality of fibers of claim 1.

9. A fiber ply comprising a plurality of fibers of claim 1 aligned in a substantially parallel array.

10. A fabric formed from a plurality of fibers of claim 1.

11. A fibrous composite comprising a plurality of fibers of claim 1 and a polymeric binder material at least partially coated on at least some of said fibers.

12. The fibrous composite of claim 11 which comprises a consolidated plurality of non-woven fiber plies, each fiber ply comprising a plurality of said fibers and wherein a polymeric binder material is at least partially coated on at least some of said fibers.

13. The fibrous composite of claim 11 which comprises a consolidated plurality of non-woven fiber plies, each fiber ply comprising a plurality of said fibers, wherein each fiber ply comprises a plurality of substantially parallel fibers, and wherein a polymeric binder material is at least partially coated on at least some of said fibers.

14. The fibrous composite of claim 11 wherein said polymeric binder material comprises from about 7% to about 20% by weight of said fibrous composite.

15. The fibrous composite of claim 11 wherein said composite has a top outer surface and a bottom outer surface, and wherein said composite further comprises at least one layer of a polymer film attached to at least one of said surfaces.

16. The fibrous composite of claim 15 wherein said at least one layer of a polymer film comprises at least one polyolefin, polyamide, polyester, polyurethane, vinyl polymer, fluoropolymer, a copolymer thereof, or a combination thereof.

17. The fibrous composite of claim 15 wherein said polymeric binder material comprises a polybutadiene, polyisoprene, polystyrene-polyisoprene-polystrene-block copolymer, a styrene-isoprene-styrene block copolymer, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, or a combination thereof.

18. An article formed from the composite of claim 1.

19. A fiber comprising ultra high molecular weight polyethylene (UHMWPE) having a tenacity of at least about 45 g/denier (40.5 g/dtex) and a tensile modules of at least about 1400 g/denier, said fiber being produced by a process comprising the steps of:

a) feeding a slurry that comprises an UHMWPE polymer and a spinning solvent to an extruder to produce a liquid mixture, the UHMWPE polymer having an intrinsic viscosity (IV) in decalin at 135° C. of at least about 30 dl/g; or feeding the UHMWPE polymer and spinning solvent into an extruder and forming both a slurry and a liquid mixture inside the extruder;

b) passing the liquid mixture through a heated vessel to form a homogeneous solution comprising the UHMWPE polymer and the spinning solvent;

c) providing the solution from the heated vessel to a spinneret to form a solution fiber;

d) drawing the solution fiber that issues from the spinneret at a draw ration of from about 1.1:1 to about 30:1 to form a drawn solution fiber;

e) cooling the drawn solution fiber to a temperature below the gel point of the UHMWPE polymer to form a gel fiber;

f) drawing the gel fiber in one or more stages at a first draw ratio DR1 of from about 1.1:1 to about 30:1;

g) drawing the gel fiber at a second draw ratio DR2;

h) removing spinning solvent from the gel fiber in a solvent removal device to form a dry fiber;

i) drawing the dry fiber at a third draw ratio DR3 in at least one stage to form a partially oriented fiber; the partially oriented fiber having an intrinsic viscosity of greater than about 19 dl/g;

j) transferring the partially oriented fiber to a post drawing operation; and k) drawing the partially oriented fiber at a post drawing temperature in the post drawing operation to a fourth draw ration DR4 of from about 1.8:1 to about 15:1 to form a highly oriented fiber product having a tenacity of at least about 45 g/denier (40.5 g/dtex).

20. A fiber comprising ultra high molecular weight polyethylene (UHMWPE) having a tenacity of at least about 45 g/denier (40.5 g/dtex) and a tensile modules of at least about 1400 g/denier, said fiber being produced by a process comprising the steps of:

a) feeding a slurry that comprises an UHMWPE polymer and a spinning solvent to an extruder to produce a liquid mixture, the UHMWPE polymer having an intrinsic viscosity (IV) in decalin at 135° C. of at least about 30 dl/g; or feeding the UHMWPE polymer and spinning solvent into an extruder and forming both a slurry and a liquid mixture inside the extruder;

b) passing the liquid mixture through a heated vessel to form a homogeneous solution comprising the UHMWPE polymer and the spinning solvent;

c) providing the solution from the heated vessel to a spinneret to form a solution fiber;

d) drawing the solution fiber that issues from the spinneret at a draw ratio of from about 1.1:1 to about 30:1 to form a drawn solution fiber;

e) cooling the drawn solution fiber to a temperature below the gel point of the UHMWPE polymer to form a gel fiber;

f) drawing the gel fiber in one or more stages at a first draw ratio DR1 of from about 1.1:1 to about 30:1;

g) drawing the gel fiber at a second draw ratio DR2;

h) removing spinning solvent from the gel fiber in a solvent removal device to form a dry fiber;

i) drawing the dry fiber at a third draw ratio DR3 in at least one stage to form a partially oriented fiber;

j) transferring the partially oriented fiber to a post drawing operation; and k) drawing the partially oriented fiber at a post drawing temperature in the post drawing operation to a fourth draw ratio DR4 of from about 1.8:1 to about 15:1 to form a highly oriented fiber product having a tenacity of at least about 45 g/denier (40.5 g/dtex).

\* \* \* \* \*